(12) United States Patent
Kyusojin et al.

(10) Patent No.: US 8,412,871 B2
(45) Date of Patent: Apr. 2, 2013

(54) INFORMATION PROCESSING APPARATUS, INFORMATION PROCESSING METHOD, AND PROGRAM

(75) Inventors: Hiroshi Kyusojin, Tokyo (JP); Hideki Matsumoto, Tokyo (JP); Masato Kajimoto, Chiba (JP); Chiaki Yamana, Kanagawa (JP); Tsuyoshi Kano, Tokyo (JP); Mitsuki Hinosugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 11/913,164

(22) PCT Filed: May 23, 2006

(86) PCT No.: PCT/JP2006/310229
§ 371 (c)(1),
(2), (4) Date: Mar. 11, 2009

(87) PCT Pub. No.: WO2006/137234
PCT Pub. Date: Dec. 28, 2006

(65) Prior Publication Data
US 2009/0172302 A1    Jul. 2, 2009

(30) Foreign Application Priority Data

Jun. 1, 2005 (JP) .................................. 2005-161217
Feb. 8, 2006 (JP) .................................. 2006-030486

(51) Int. Cl.
*G06F 15/163* (2006.01)
*G06F 13/24* (2006.01)
(52) U.S. Cl. .............................. 710/260; 712/1; 709/223
(58) Field of Classification Search .................. 710/260, 710/267, 268; 712/1; 709/223
See application file for complete search history.

(56) References Cited

U.S. PATENT DOCUMENTS

| | | | | |
|---|---|---|---|---|
| 5,761,427 | A * | 6/1998 | Shah et al. | 709/223 |
| 6,021,456 | A * | 2/2000 | Herdeg et al. | 710/260 |
| 6,078,970 | A * | 6/2000 | Nordstrom et al. | 710/19 |
| 6,205,509 | B1 * | 3/2001 | Platko et al. | 710/269 |
| 6,298,409 | B1 * | 10/2001 | Sheikh et al. | 710/260 |
| 6,434,630 | B1 * | 8/2002 | Micalizzi et al. | 710/5 |
| 6,574,694 | B1 * | 6/2003 | Chen et al. | 710/263 |
| 6,788,704 | B1 * | 9/2004 | Lindsay | 370/465 |
| 7,234,101 | B1 * | 6/2007 | Konda et al. | 714/798 |
| 7,523,229 | B2 * | 4/2009 | Hatakeyama | 710/28 |
| 7,669,190 | B2 * | 2/2010 | Konda et al. | 717/128 |

(Continued)

FOREIGN PATENT DOCUMENTS

| | | |
|---|---|---|
| JP | 04-241035 | 8/1992 |
| JP | 11-212904 A | 8/1999 |

(Continued)

*Primary Examiner* — Paul R Myers
*Assistant Examiner* — Trisha Vu
(74) *Attorney, Agent, or Firm* — Finnegan, Henderson, Farabow, Garrett & Dunner LLP

(57) ABSTRACT

The present invention relates to an information processing apparatus, an information processing method, and a program capable of simplifying an interrupt processing and reducing a time necessary to the interrupt processing. An interrupt generation unit 140 generates an interrupt signal. An interrupt status holding unit 142 stores an interrupt status showing a cause of generation of the interrupt signal. An interrupt status supply unit 141 supplies an interrupt status stored by an interrupt status holding unit to a RAM and causes the RAM to store it. A CPU executes a predetermined processing in response to the interrupt status stored to the RAM. The present invention can be applied to, for example, a network card.

13 Claims, 17 Drawing Sheets

U.S. PATENT DOCUMENTS

2005/0213665 A1    9/2005    Kyusojin
2006/0233116 A1    10/2006    Kyusojin et al.
2006/0242334 A1    10/2006    Kyusojin et al.

FOREIGN PATENT DOCUMENTS

JP    3549703 B2    8/2004
JP    2004-355543    12/2004
JP    2006-293800    10/2006

* cited by examiner

PRIOR ART

| BIT | STATUS | PROCESSING |
|---|---|---|
| 0 | COMPLETION OF TRANSMISSION | RELEASE OF RAM |
| 1 | COMPLETION OF RECEPTION | READ OUT OF PACKET |
| 2 | ERROR | RESET |

160

| BIT | STATUS | PROCESSING |
|---|---|---|
| 0 | COMPLETION OF TRANSMISSION | RELEASE OF RAM |
| 1 | COMPLETION OF RECEPTION | READ OUT OF PACKET |
| 2 | ERROR | RESET |
| ⋮ | ⋮ | ⋮ |
| 31 - 28 | INTERRUPT VERSION BIT | — |

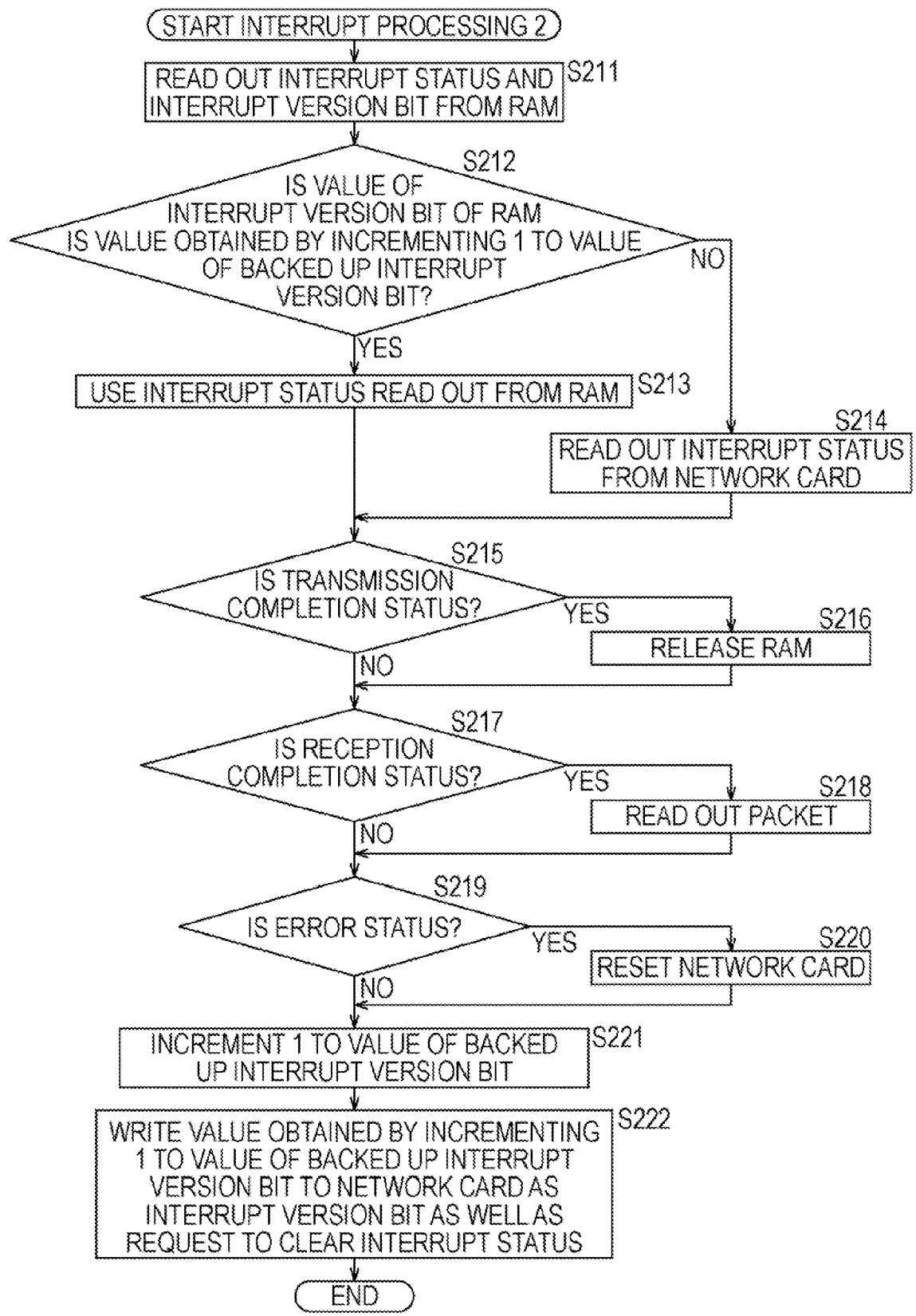

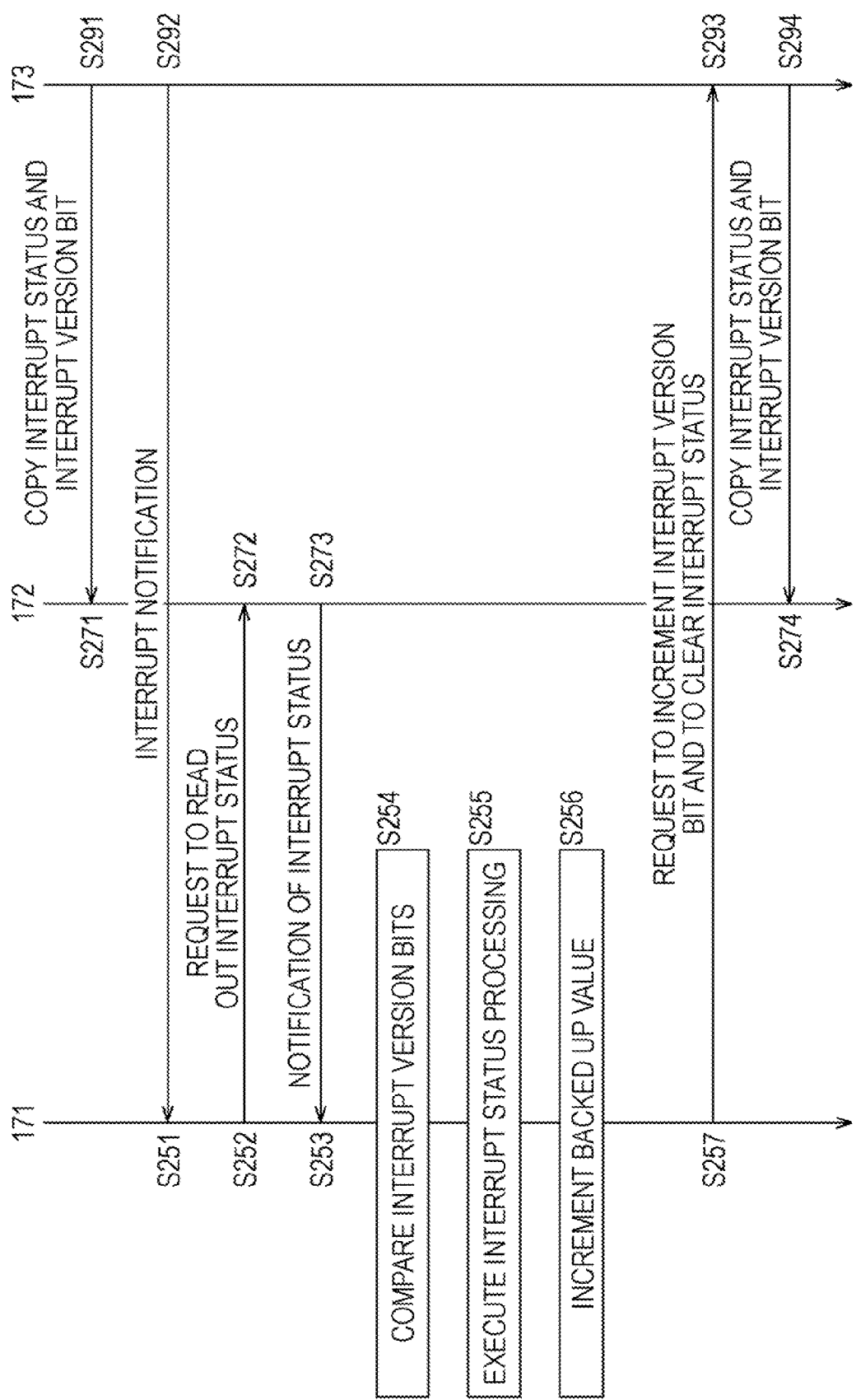

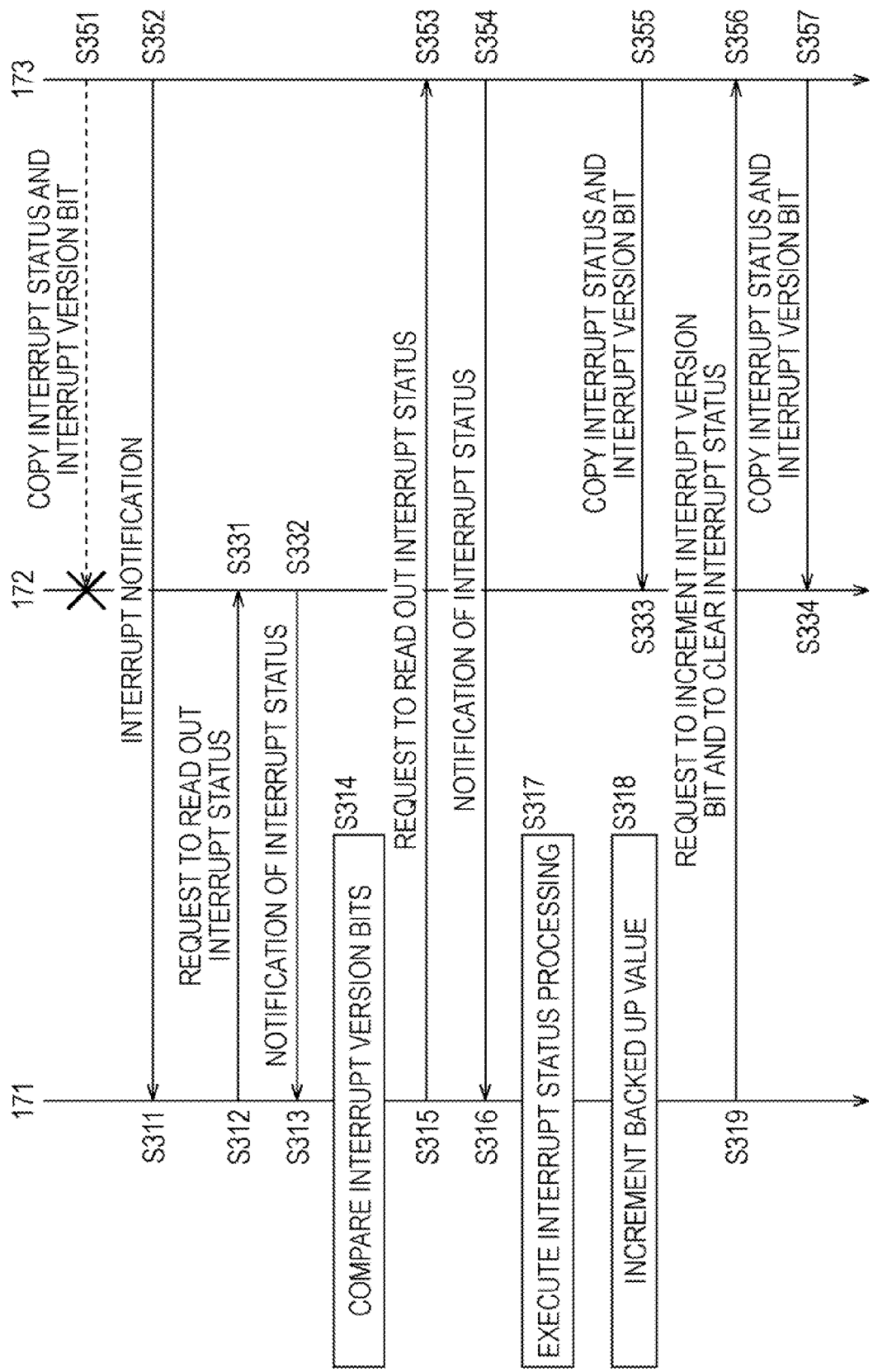

INFORMATION PROCESSING APPARATUS, INFORMATION PROCESSING METHOD, AND PROGRAM

TECHNICAL FIELD

The present invention relates to an info oration processing apparatus, an information processing method and a program, and more particularly to an information processing apparatus, an information processing method and a program capable of simplifying an interrupt processing and reducing a time necessary to the interrupt processing.

BACKGROUND ART

FIG. 1 is a block diagram showing an example of a personal computer 1 having a network card for executing a DMA (Direct Memory Access) transfer using a descriptor.

As shown in FIG. 1, a CPU (Central Processing Unit) 11 is connected to a ROM (Read Only Memory) 12 and a RAM (Random Access Memory) 13 through a bus 14. The CPU 11 executes various processings according to a program stored to the ROM 12 or a program recorded to a recording unit 18.

For example, the CPU 11 causes a descriptor region 31 (to be described later) of the RAM 13 to store the address, the packet size (length), and the like of the packet region 32 of the RAM 13, to which a packet as a target of DMA transfer is stored, as a descriptor, thereby a network card 19 DMA transfers the packet.

Further, CPU 11 executes an interrupt processing by reading out an interrupt status showing an cause of generation (status) of an interrupt signal stored to the network card 19 in response to the interrupt signal supplied from the network card 19 and executing an interrupt status processing corresponding to the interrupt status.

RAM 13 is composed of a descriptor region 31 in which the descriptor is stored, a packet region 32 in which the packet as the target of the DMA transfer is stored, and the like.

An input/output interface 15 is connected to the CPU 11 through the bus 14. An input unit 16 composed of a keyboard, a mouse, and the like and an output unit 17 composed of a CRT (Cathode Ray Tube) display and the like are connected to the input/output interface 15. Then, CPU 11 executes various processings in response to an instruction input from the input unit 16. Then, the CPU 11 outputs an image, audio, and the like obtained from a result of a processing to the output unit 17.

The recording unit 18 connected to the input/output interface 15 is composed of, for example, hard disc and the like and records the program to be executed by the CPU 11 and various types of data. The network card 19 executes a DMA transfer. Specifically, the network card 19 reads out a packet stored to the packet region 32 of the RAM 13 based on the descriptor stored to the descriptor region 31 of the RAM 13 and transmits the packet to other apparatus through a not shown network. Further, the network card 19 receives a packet from the other apparatus through the not shown network and causes the packet region 32 of the RAM 13 to store the packet based on the descriptor.

Further, the network card 19 generates an interrupt signal and supplies it to the CPU 11 as well as sets an interrupt status and stores it.

When a removable media 21 such as a magnetic disc, an optical disc, an optomagnetic disc, a semiconductor memory, or the like is mounted on the drive 20 connected to the input/output interface 15, the drive 20 drives it and obtains the program, data, and the like recorded thereto. The obtained program and data are transferred and record to the recording unit 18 when necessary.

FIG. 2 is a block diagram showing an example of a functional arrangement of the network card 19 of FIG. 1.

The network card 19 of FIG. 2 is composed of a DMA transfer unit 51, a packet communication unit 52, an interrupt generation unit 53, and an interrupt status holding unit.

The DMA transfer unit 51 controls the DMA transfer. Specifically, the DMA transfer unit 51 reads out the descriptor from the descriptor region 31 (FIG. 1) in response to a DMA transfer request supplied from the CPU 11. Then, the DMA transfer unit 51 reads out a packet as a target of DMA transfer from the packet region 32 based on the descriptor and supplies it to the packet communication unit 52 or stores a packet supplied from the packet communication unit 52 to the packet region 32. Further, the DMA transfer unit 51 supplies the status information showing the status of processing (for example, transmission/reception completion state of a packet, an error state of transmission/reception, and the like) executed by and supplied from the packet communication unit 52 to the interrupt generation unit 53.

The packet communication unit 52 transmits the packet from the DMA transfer unit 51 to other apparatus through the not shown network. The packet communication unit 52 receives the packet from the other apparatus through the not shown network and supplies it to the DMA transfer unit 51. Further, the packet communication unit 52 supplies the status information to the DMA transfer unit 51.

The interrupt generation unit 53 generates an interrupt signal in response to the status information from the DMA transfer unit 51 and supplies it to the CPU 11. Further, the interrupt generation unit 53 sets an interrupt status in response to the status information, supplies the interrupt status to the interrupt status holding unit 54, and causes the interrupt status holding unit 54 to store it.

The interrupt status holding unit 54 holds the interrupt status from the interrupt generation unit 53. The interrupt status holding unit 54 clears (deletes) the interrupt status in response to a request from the CPU 11.

Next, an interrupt generation processing executed by the personal computer 1 will be explained referring to FIG. 3, At step S11, the interrupt generation unit 53 of the network card 19 generates an interrupt signal in response to the status information from the DMA transfer unit 51 and notifies (transmits) the interrupt signal to the CPU 11, and then a process goes to step S12.

At step S1, the CPU 11 receives the interrupt signal from the interrupt generation unit 53 and the process goes to step S2. At step S2, the CPU 11 requests the network card 19 to read out the interrupt status, and the process goes to step S3.

At step S12, the interrupt status holding unit 54 of the network card 19 receives the request for reading out the interrupt status from the CPU 11, and the process goes to step S13. At step S13, the interrupt status holding unit 54 notifies (transmits) the interrupt status held thereby at the time in response to the request for reading out the interrupt status, and the process goes to step S14.

At step S3, the CPU 11 receives the interrupt status from the interrupt status holding unit 54, and the process goes to step S4. At step S4, the CPU 11 executes an interrupt status processing corresponding to the interrupt status.

When, for example, the interrupt status shows the completion of transmission of a packet as a target of DMA transfer executed by the packet communication unit 52, the CPU 11 releases the packet region 32, to which the transmission-completed packet is stored, as an interrupt status processing.

That is, the CPU 11 deletes the transmission-completed packet stored to the packet region 32.

After the processing at step S4, the process goes to step S5, at which the CPU 11 requests the network card 19 to clear the interrupt status held to the interrupt status holding unit 54, thereby the processing is finished. As described above, the CPU 11 executes the processings from steps S2 to S5 as the interrupt processing in response to the interrupt signal supplied from the interrupt generation unit 53 at step S1 and finishes the processing.

At step S14, the interrupt status holding unit 54 of the network card 19 receives a request for clearing the interrupt status from the CPU 11 and clears the interrupt status in response to the request. That is, the interrupt status holding unit 54 clears the respective bits of the held interrupt status (signal).

Incidentally, various methods are conventionally proposed in an apparatus for executing an interrupt processing to reduce a load of an interrupt notification processing. For example, there is an interrupt processing system having an interrupt aggregation means interposed between an interrupt generation device and an interrupt processing device to prevent multiple interrupt (refer to, for example, Patent Document 1).

Further, there is a data transfer system for reducing the number of times of notification in such a manner that when a DMA transfer is completed, a DMA controller of an external I/F (interface) equipment updates only the status of an interrupt signal stored to a status register in the external I/F equipment without generating an interrupt signal to a CPU, and the CPU refers to the status stored to the status register in response to a timer interrupt generated at each predetermined time (refer to, for example, Patent Document 2).

[Patent Document 1] Specification of Japanese Patent No. 3549703

[Patent Document 2] Japanese Unexamined Patent Application Publication No. 11-212904

DISCLOSURE OF THE INVENTION

Problems to be Solved by the Invention

In general, an access to a register such as the interrupt status holding unit 54 and the like of the network card 19 executed by the CPU 11 through the bus 14 and the input/output interface 15 takes a long time as compared with an access to the RAM 13 executed by the CPU 11 through the bus 14.

Accordingly, the processing for the CPU 11 to read out the interrupt status from the interrupt status holding unit 54 (hereinafter, referred to as read-out processing), which is explained at steps S2 and S3 of FIG. 3, takes a long time.

On the other hand, a time necessary to the interrupt status processing is shorter than a time necessary to the read processing. Further, the time necessary to the interrupt status processing is reduced as the processing capability of the CPU 11 is improved. That is, the difference between the time necessary to the interrupt status processing and the time necessary to the read-out processing is increased as the processing capability of the CPU 11 is improved.

Thus, it is preferable to reduce the load of the CPU 11 by simplifying the interrupt processing and reducing the time necessary to the interrupt processing by reducing the access of the CPU 11 to the network card 19 in the read-out processing.

The present invention, which was made in view of the above circumstances, is to simplify the interrupt processing and to reduce the time necessary to the interrupt processing.

Means for Solving the Invention

An information processing apparatus of a first aspect of the present invention includes a generation means for generating an interrupt signal, a first memory means for storing a status showing a cause of generation of the interrupt signal generated by the generation means, and an execution means for executing a predetermined processing in response to the status stored to the first memory means, wherein the generation means includes a second memory means for storing the status of the interrupt signal and a memory control means for causing the first memory means to store the status stored by the second memory means status.

A first time necessary for the execution means to read out the status stored to the first memory means may be shorter than a second time necessary for the execution means to read out the status stored to the second memory means.

The second memory means may include a first memory region of determination information for determining whether or not a first status stored by the first memory means is synchronized with a second status stored by the second memory means, the first memory means may include a second memory region for storing the determination information as well as may further include a third memory region, which is different from the second memory region, for temporarily storing the determination information, the memory control means may store the status stored to the second memory means status to the first memory means as well as may further store the determination information recorded to the first memory region of the second memory means to the second memory region of the first memory means, the execution means may execute, when it is determined that the first status stored, by the first memory means is synchronized with the second status stored by the second memory means based on the determination information stored to the third memory region, the predetermined processing in response to the first status stored by the first memory means, and the execution means may execute, when it is determined that the first status stored, by the first memory means is not synchronized with the second status stored by the second memory means based on the determination information stored to the third memory region, the predetermined processing in response to the second status stored by the second memory mean.

The determination information may be shown by a numerical value, after a predetermined processing is executed, in response to the first status or the second status, the execution means may cause the third memory region to store the same value as the determination information stored to the first memory region as well as may increment 1 to the value of the determination information stored to the first memory region, and next, when the predetermined processing is executed, the execution means may compare the determination information stored to the second memory region with the determination information stored to the third memory region, and when the value of the determination information stored to the second memory region is larger than the determination information stored to the third memory region by 1, the execution means may determine that the first status stored by the first memory means is synchronized with the second status stored by the second memory means, may execute the predetermined, processing in response to the first status stored by the first memory means, otherwise may determine that the first status stored by the first memory means is not synchronized with the second status stored by the second memory means, and may execute the predetermined processing in response to the second status stored by the second memory means.

An information processing apparatus of a second aspect of the present invention includes a generation means for generating an interrupt signal, a memory means for storing a status showing a cause of generation of the interrupt signal generated by the generation means, and a memory control means for causing other information processing apparatus to store the status stored by the memory means so that the other information processing apparatus executes a predetermined processing in response to the status.

The memory means may further store determination information for determining whether or not the status stored by the memory means is synchronized with the status stored to the other information processing apparatus, and the memory control means may cause the other information processing apparatus to record the determination information together with the status.

An information processing method of the second aspect of the present invention includes a generation step of generating the interrupt signal, a first memory control step for causing the memory means to store the status of the interrupt signal generated by processing the generation step, and a second memory control step for causing other information processing apparatus to store the status stored by the memory means so that the other information processing apparatus executes a predetermined processing in response to the status.

A program of the second aspect of the present invention includes a generation step of generating the interrupt signal, a first memory control step for causing the memory means to store the status of the interrupt signal generated by the processing of the generation step, and a second memory control step for causing other information processing apparatus to store the status stored by the memory means so that the other information processing apparatus executes a predetermined processing in response to the status.

An information processing apparatus of a third aspect of the present invention includes a memory means for storing the status of an interrupt signal supplied from other information processing apparatus, and an execution means for executing a predetermined processing in response to the status stored by the memory means.

The memory means may further obtain determination information for determining whether or not the status stored by the memory means is synchronized with the status stored to the other information processing apparatus from the other information processing apparatus together with the status and stores the status and the determination information and the execution means may determine whether or not the status stored by the memory means is synchronized with the status stored to the other information processing apparatus based on the determination information, and when it is determined that they are synchronized with each other, the execution means may execute the predetermined processing in response to the status stored by memory mean, whereas when it is determined that they are not synchronized with each other, the execution means may obtain the status from the other information processing apparatus and execute the predetermined processing in response to the status obtained from the other information processing apparatus.

An information processing apparatus may further include an interrupt processing memory means for storing a table in which the status of the interrupt signal is caused to correspond to a processing corresponding to the status, and the execution means may execute the predetermined processing based on the table stored to the interrupt processing memory means.

An information processing method of the third aspect of the present invention includes a memory control step of causing the status of an interrupt signal supplied from other information processing apparatus to be stored and an execution step of executing a predetermined processing in response to the status stored by the processing at the memory control step.

A program of the third aspect of the present invention includes a memory control step of causing the status of an interrupt signal supplied from other information processing apparatus to be stored, and an execution step of executing a predetermined processing in response to the status stored by the processing at the memory control step.

According to the first aspect of the present invention, an interrupt signal is generated and a status showing a cause of generation of the interrupt signal is stored to the second memory means, and the status is stored to the first memory means. Then, a predetermined processing is executed in response to the status stored to the first memory means.

According to the second aspect of the present invention, an interrupt signal is generated and a status showing a cause of generation of the interrupt signal is stored, and the status is stored to other information processing apparatus which executes a predetermined processing in response to the status.

According to the third aspect of the present invention, the status of the interrupt signal supplied from other information processing apparatus is stored, and a predetermined processing is executed in response to the status.

Advantages of the Invention

According to the present invention, an interrupt processing can be simplified and the time necessary to the interrupt processing can be reduced.

BRIEF DESCRIPTION OF THE DRAWINGS

FIG. 18 is a flowchart explaining an interrupt processing 2 executed by the CPU.

FIG. 19 is an arrow chart explaining an interrupt generation processing executed by the personal computer.

FIG. 20 is an arrow chart explaining an interrupt generation processing executed by the personal computer.

REFERENCE NUMERALS

Figure 1:
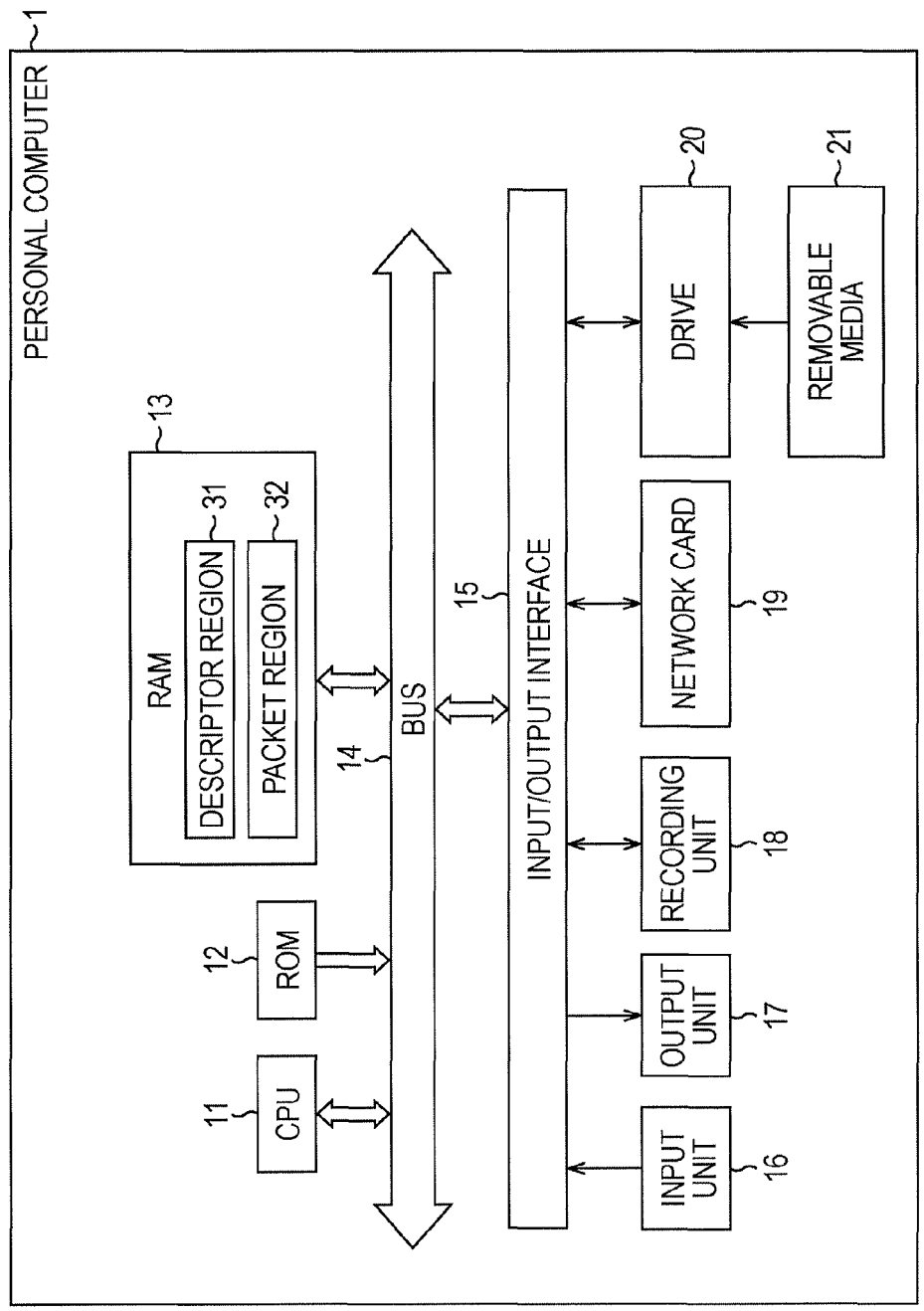
FIG. 1 is a block diagram showing an example of a conventional personal computer.

51 DMA transfer unit, 52 packet communication unit, 101 personal computer, 111 CPU, 112 RAM, 113 network card, 140 interrupt generates unit, 141 interrupt status supply unit, 142 interrupt status holding unit, 161 personal computer, 171 CPU, 172 RAM, 173 network card, 182 interrupt version bit backup region, 191 interrupt status holding unit

BEST MODE FOR CARRYING OUT THE INVENTION

A specific embodiment to which the present invention is applied will be explained below in detail referring to the drawings.

Figure 4:
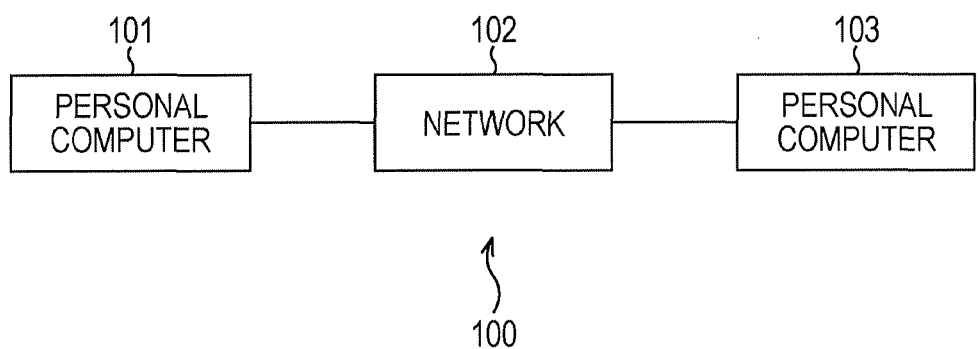
FIG. 4 is a block diagram showing an arrangement example of an embodiment of an information processing system to which the present invention is applied.

FIG. 4 is a block diagram showing an arrangement example of an embodiment of an information processing system 100 to which the present invention is applied.

The information processing system 100 of FIG. 4 is composed of a personal computer 101, a network 102, and a personal computer 103.

The personal computer 101 and the personal computer 103 are connected to each other through the network 102, for example, a LAN (Local Area Network), The Internet, and the like and mutually execute communication. For example, the personal computers 101 and 103 mutually transfer a packet (data) to which a header in conformity with a TCP (Transmission Control Protocol), an IP (Internet Protocol), and the like is added.

Figure 5:
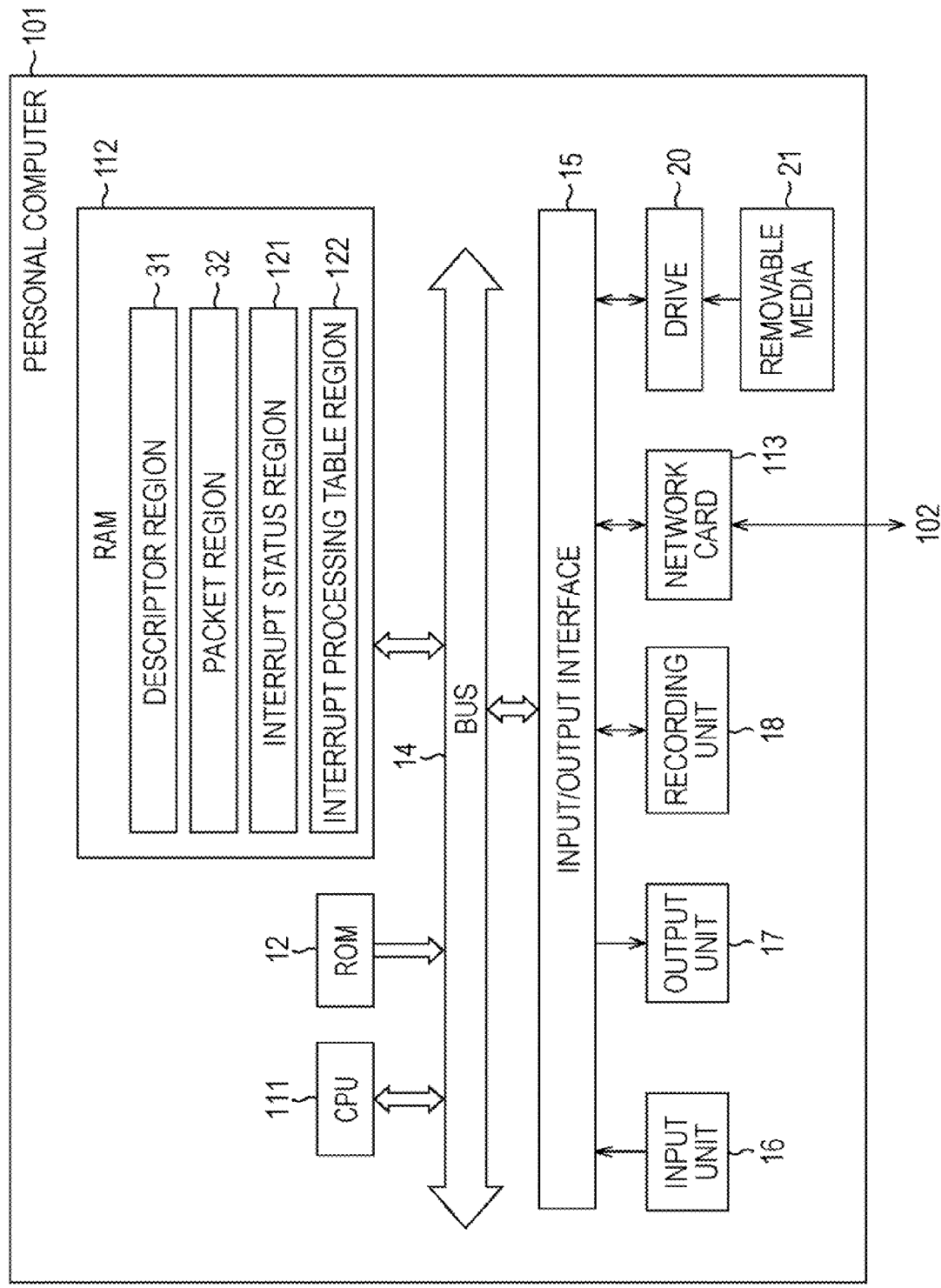
FIG. 5 is a block diagram showing an arrangement example of hardware of a personal computer of FIG. 4.

FIG. 5 is a block diagram showing an arrangement example of hardware of the personal computer 101 of FIG. 4. Note that the same components as those of FIG. 1 are denoted by the same reference numerals, and the explanation thereof is omitted.

The personal computer 101 of FIG. 5 is composed of a ROM 12, a bus 14, an input/output interface 15, an input unit 16, an output unit 17, a recording unit 18, a drive 20, a CPU 111, a RAM 112, and a network card 113.

The CPU 111 is connected to the ROM 12 and the RAM 112 through the bus 14, The CPU 111 executes various processings according to a program stored to the ROM 112 or a program recorded to the recording unit 18.

For example, the CPU 111 causes a descriptor region 31 of the RAM 112 to store the address, the packet size, and the like of a packet region 32 of the RAM 112, to which a packet as a target of DMA transfer is stored, as a descriptor, thereby a network card 113 DMA transfers the packet.

Further, the CPU 111 executes an interrupt processing in response to an interrupt signal supplied from the network card 113. Specifically, the CPU 111 reads out an interrupt status showing a cause of generation (status) of the interrupt signal stored to an interrupt status region 121 (to be described later) of the RAM 112. Then, the CPU 111 executes an interrupt status processing corresponding to the read out interrupt status based on an interrupt processing table 160 (FIG. 7 to be described later) in which an interrupt status processing is caused to correspond to a status shown by the interrupt status processing. The interrupt processing table 160 is stored to an interrupt processing table region 122.

The RAM 112 is composed of the descriptor region 31, the packet region 32, the interrupt status region 121, the interrupt processing table region 122, and the like.

The interrupt status region 121 stores an interrupt status supplied from the network card 113. Further, the interrupt processing table region 122 stores the interrupt processing table 160 previously set by the CPU 111.

The network card 113 is composed of, for example, a microcomputer and the like and executes a DMA transfer by executing a predetermined program. Specifically, the network card 113 reads out a packet stored to the packet region 32 of the RAM 112 based on the descriptor stored to the packet region 32 of the RAM 112 and transmits the packet to the personal computer 103 through the network 102. Further, the network card 113 receives a packet from the personal computer 103 through the network 102 and stores the packet to the packet region 32 of the RAM 112 based on the descriptor.

Further, the network card 113 generates an interrupt signal and supplies it to the CPU 111. Further, the network card 113 sets and stores an interrupt status as well as supplies the interrupt status to the interrupt status region 121 of the RAM 112 and causes the interrupt status region 121 to store it.

note that since the personal computer 103 of FIG. 4 is arranged similarly to the personal computer 101, the explanation thereof is omitted.

Figure 2:
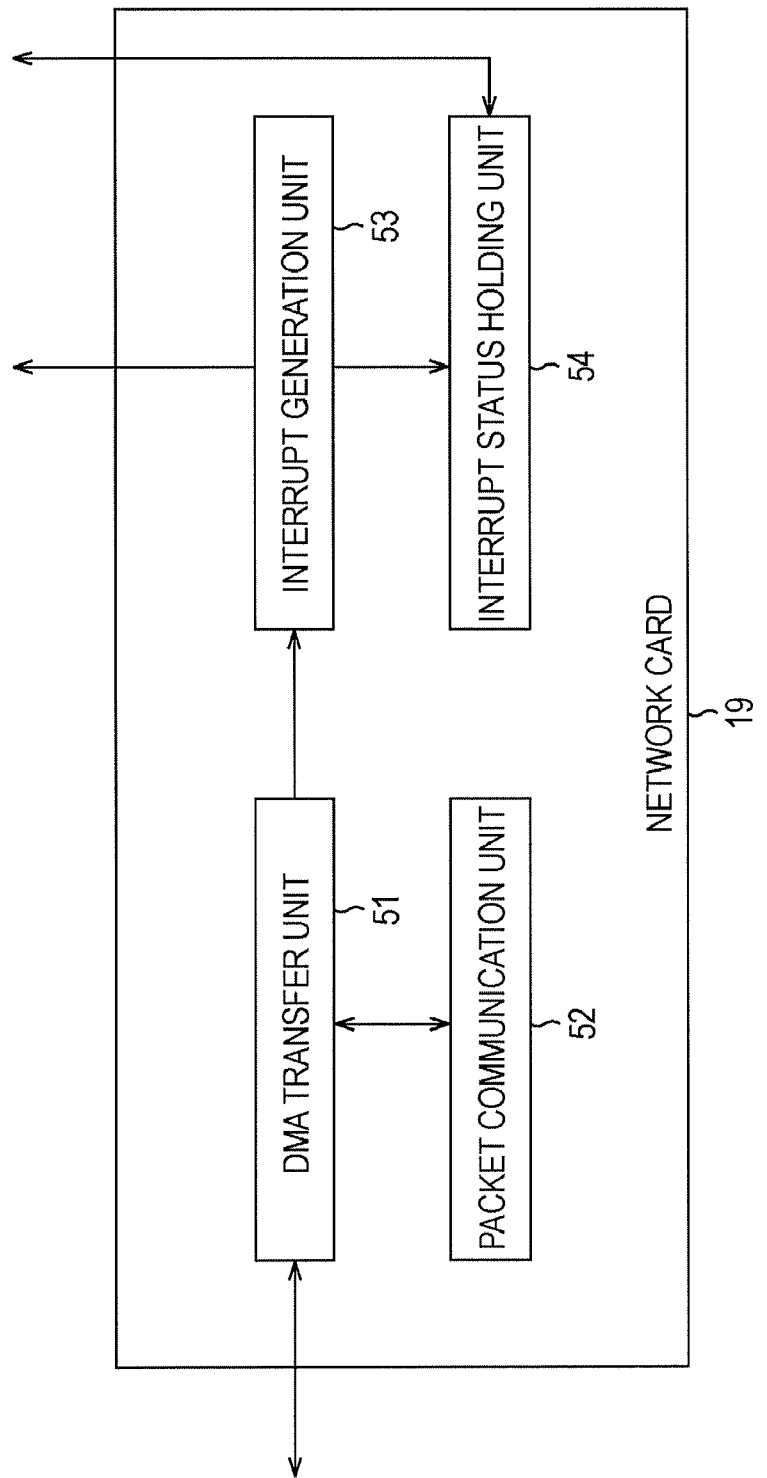
FIG. 2 is a block diagram showing an example of a functional arrangement of a network card of FIG. 1.
Figure 6:
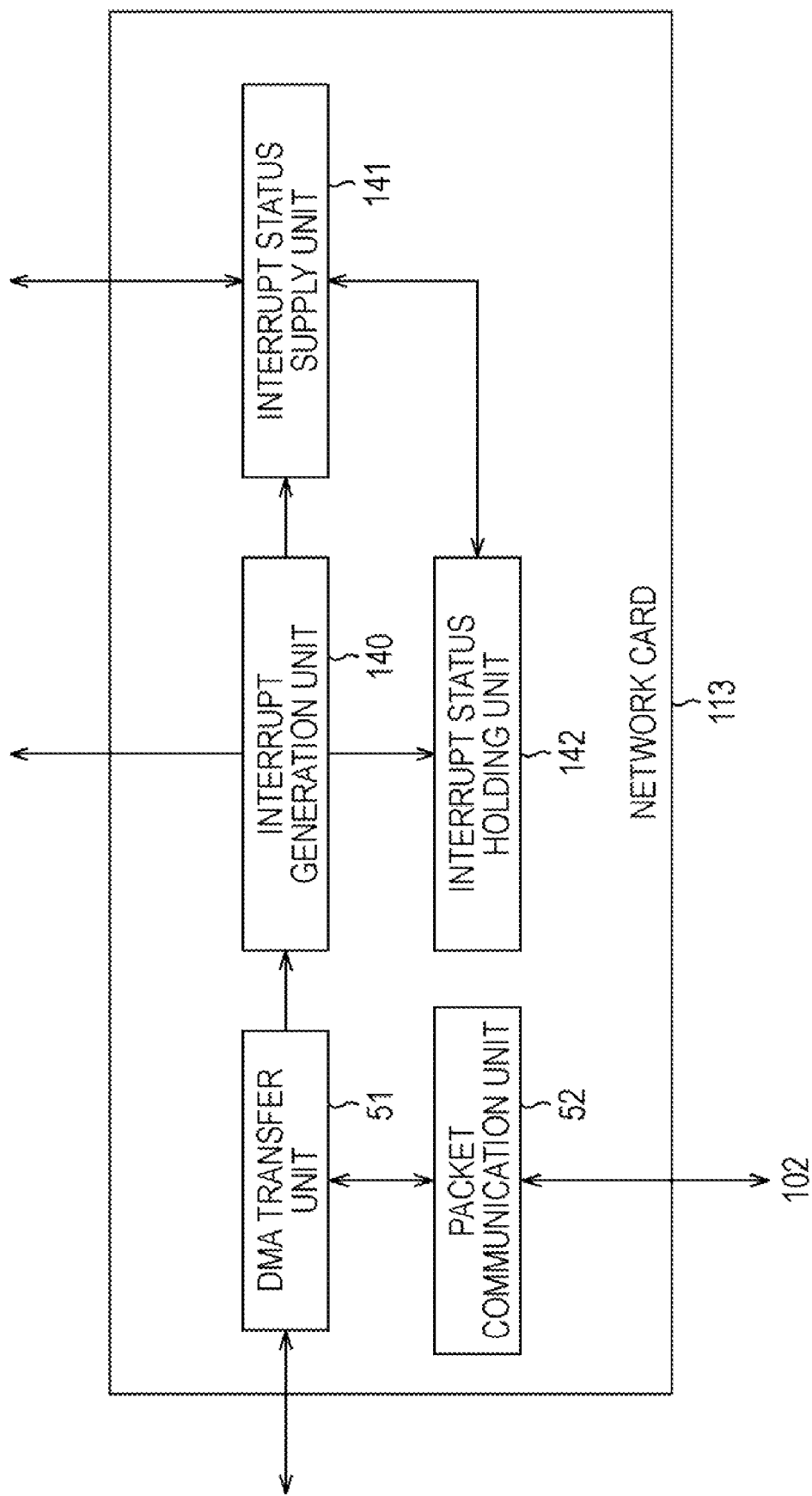
FIG. 6 is a block diagram showing an example of a functional arrangement of a network card of FIG. 5.

FIG. 6 is a block diagram showing an arrangement example of a function provided with the network card 113 of FIG. 5 when the network card 113 executes a predetermined program. Note that the same components as those of FIG. 2 are denoted by the same reference numerals.

The network card 113 of FIG. 6 is composed of a DMA transfer unit 51, a packet communication unit 52, an interrupt generation unit 140, an interrupt status supply unit 141, and an interrupt status holding unit 142. Note that the packet communication unit 52 of FIG. 6 executes packet communication through a network 102.

The interrupt generation unit 140 generates an interrupt signal in response to the status information from the DMA transfer unit 51 and supplies it to the CPU 11. Further, the interrupt generation unit 140 sets an interrupt status in response to the status information, supplies the interrupt status to the interrupt status holding unit 142, and causes the interrupt status holding unit 142 to store (update) it. The interrupt generation unit 140 notifies the interrupt status supply unit 141 of the update of the interrupt status.

The interrupt status supply unit 141 reads out an interrupt status from the interrupt status holding unit 142 in response to the notification from the interrupt generation unit 140, supplies the interrupt status to the interrupt status region 121 of the RAM 112 (FIG. 5), and causes the region 121 to store it. Further, the interrupt status supply unit 141 clears (deletes) the respective bits of the interrupt status (signal) held to the interrupt status holding unit 142 in response to a request from the CPU 111. The interrupt status holding unit 142 holds the interrupt status from the interrupt generation unit 140.

Figures 7, 8:
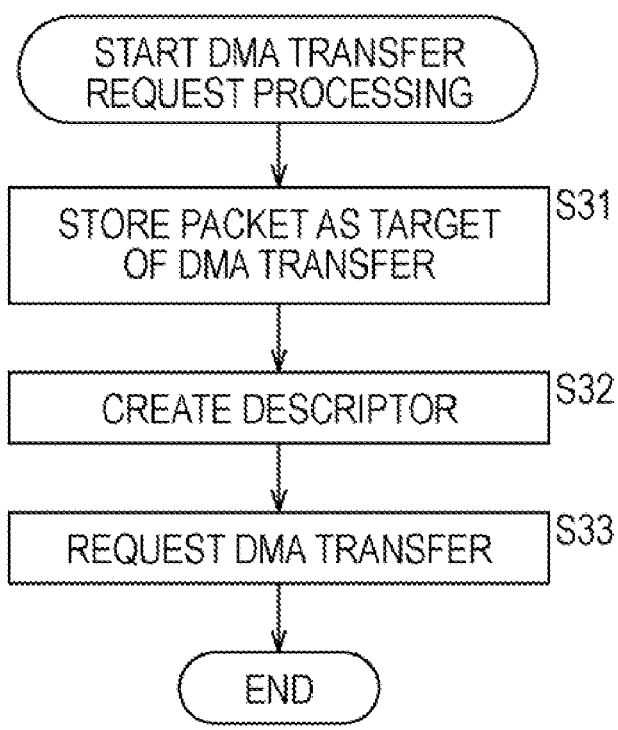
FIG. 7 is a view showing an example of an interrupt processing table.
FIG. 8 is a flowchart explaining a DMA transfer request processing executed by a CPU.

FIG. 7 shows an example of the interrupt processing table 160 stored to the interrupt processing table region 122 of FIG. 5. The data stored to the interrupt processing table region 122 of FIG. 5 is the interrupt status and the interrupt status processing which are caused to correspond to each other, the interrupt status being read out from the interrupt status holding unit 142 and held to the interrupt status holding unit 142. That is, it is assumed that the interrupt status (signal), which is read out from the interrupt status holding unit 142 and held to the interrupt status holding unit 142, is composed of 32 bits and that information is described by the same bit distribution as that of FIG. 7.

In the interrupt processing table 160 of FIG. 7, the interrupt status processing is caused to correspond to a status shown by the interrupt status and to the bits of the interrupt status to which the status is allocated. Here, it is assumed that when a predetermined bit of an interrupt status is "1", the interrupt status shows a status allocated to the bit.

For example, in the interrupt processing table 160, a processing for releasing the packet region 32 of the RAM 112, in which a packet whose transmission is completed by the packet communication unit 52 is stored, is caused to correspond to a status, which is the completion of packet transmission executed by the packet communication unit 52 (hereinafter, referred to as a transmission completion status) and to the low-order 0 bit of the interrupt status as an interrupt status processing.

That is, when the low-order 0 bit (0 bit from the low-order) of the interrupt status is "1" (when the interrupt status shows a completion status), the CPU 111 releases the packet region 32 of the RAM 112 as an interrupt status processing corresponding to the interrupt status.

Further, in the interrupt processing table 160, a processing, which reads out a packet from the packet region 32, in which the packet received by the packet communication unit 52 is stored, and executes a predetermined processing using the packet, is caused to correspond to a status, which is the completion of packet reception executed by the packet communication unit 52 (hereinafter, referred to as a reception completion status), and to the low-order first bit of the interrupt status as an interrupt status processing.

Further, in the interrupt processing table 160, a processing for resetting the network card 113 is caused to correspond to a status, which is a packet transmission or reception error caused by the packet communication unit 52 (hereinafter, referred to as an error status), and to the low-order second bit of the interrupt status as an interrupt status processing.

Note that the interrupt status may snow one status or a plurality of statuses. When, for example, a low-order 0 bit and the low-order first bit of the 32 bits of the interrupt status are "1", the interrupt status shows both a transmission completion status and a reception completion status.

Next, a DMA transfer request processing executed by the CPU 111 of FIG. 5 will be explained referring to FIG. 8. The DMA transfer request processing is started when, for example, a user instructs to transmit a packet to the personal computer 103 by manipulating the input unit 16.

At step S31, the CPU 111 causes the packet region 32 of the RAM 112 to store a packet to be transmitted to the personal computer 103, that is, a packet as the target of DMA transfer, and the process goes to step S32 goes step S32.

At step S32, the CPU 111 creates the descriptor based on the information such as the address, the packet size, and the like of the packet region 32 to which the packet is stored and causes the descriptor region 31 to store the descriptor at step S31, and the process goes to step S33.

At step S33, the CPU 111 requests a DMA transfer to the network card 113 and finishes the processing.

Note that although the case, in which CPU 111 requests the network card 113 to execute the DMA transfer and a packet is transmitted to the personal computer 103, is described in FIG. 8, the same processing is also executed in a case in which a packet is received from the personal computer 103.

In this case, the processing at step S31 is not executed, and the information such as the address and the like of the packet region 32 to which the received packet is stored to the descriptor created at step S32.

Next, a DMA transfer processing executed by the network card 113 of FIG. 6 will be explained referring to FIG. 9. The DMA transfer processing is started when, for example, the CPU 111 requests the DMA transfer at step S33 of FIG. 8.

At step S51, the DMA transfer unit 51 executes the DMA transfer based on the descriptor stored to the descriptor region 31 at step 332 of FIG. 8. Specifically, the DMA transfer unit 51 reads out a packet from the packet region 32 based on the descriptor and transmits it to the personal computer 103 through the packet communication unit 52 or stores the packet received from the packet communication unit 52 to the packet region 32.

After the processing at step S51, the process goes to step S52 at which the packet communication unit 52 determines whether or not an error occurs to the transmission or the reception of the packet, and when it is determined that no error occurs, the process goes to step S53.

At step S53, the DMA transfer unit 51 determines whether or not there is a packet as the target of DMA transfer based on the descriptor, and when it is determined that there is the packet as the target of DMA transfer, the process returns to step S51 and repeats the processing described above.

On the other hand, when it is determined at step S52 that the error occurs, the packet communication unit 52 supplies the status information showing the error to the interrupt generation unit 140 through the DMA transfer unit 51, and the process goes to step S54.

Further, when it is determined at step S53 that there is no packet as the target of DMA transfer, the packet communication unit 52 supplies the status information showing the completion of transmission or reception to the interrupt generation unit 140 through the DMA transfer unit 51, and the process goes to step S54.

At step 554, the interrupt generation unit 140 sets an interrupt status in response to the status information from the DMA transfer unit 51 and holds the interrupt status to the interrupt status holding unit 142.

When, for example, the status information showing an error is supplied from the DMA transfer unit 51, the interrupt generation unit 140 sets the interrupt status to an interrupt status showing an error status and causes the interrupt status holding unit 142 to hold a 32-bit interrupt status whose low-order second bit is "1". Further, when the status information showing the completion of transmission or reception is supplied from the DMA transfer unit 51, the interrupt generation unit 140 sets the interrupt status to an interrupt status showing a transmission completion status or a reception completion status and causes the interrupt status holding unit 142 to hold a 32-bit interrupt status whose low-order 0 bit or low-order first bit is "1".

After the processing at step S54, the process goes to step S55 at which the interrupt generation unit 140 notifies the interrupt status supply unit 141 of the update of the interrupt status, and the process goes to step S56.

At step S56, the interrupt generation unit 140 generates an interrupt signal and supplies it to the CPU 111, thereby the processing is finished.

Next, an interrupt status copy processing executed by the network card 113 will be explained referring to FIG. 10.

At step S71, the interrupt status supply unit 141 determines whether or not the interrupt status is updated. Specifically, when it is notified at step S55 of FIG. 9 that the interrupt status is updated or when the interrupt status is cleared in response to a request from the CPU 111, the interrupt status supply unit 141 determines that the interrupt status is updated. Otherwise, the interrupt status supply unit 141 determines that the interrupt status is not updated.

When it is determined at step S71 that the interrupt status is not updated, the interrupt status supply unit 141 waits until the interrupt status is updated.

On the other hand, when it is determined at step S71 that the interrupt status is updated, the process goes to step S72 at which the interrupt status supply unit 141 reads out the interrupt status from the interrupt status holding unit 142, and the process goes to step S73.

At step S73, the interrupt status supply unit 141 copies the interrupt status read out at step S72 to the interrupt status region 121 of the RAM 112. That is, the interrupt status supply unit 141 supplies the interrupt status to the RAM 112. The RAM 112 stores the interrupt status to the interrupt status region 121.

Next, an interrupt processing 1 executed by the CPU 111 will be explained referring to FIG. 11. The interrupt processing 1 is started when an interrupt signal is supplied by the interrupt generation unit 140 at, for example, step S56 of FIG. 9.

At step S91, the CPU 111 reads out the interrupt status from the interrupt status region 121 of the RAM 112, and the process goes to step S92.

At step S92, the CPU 111 determines whether or not the status shown by the interrupt status read out at step S91 is a transmission completion status, that is, whether or not the low-order 0 bit of the 32-bit interrupt status is "1" based on the interrupt processing table 160 stored to the interrupt processing table region 121 of the RAM 112. When the CPU 111 determines that status is the transmission completion status, the process goes to step S93.

At step S93, the CPU 111 releases the packet region 32 of the RAM 112, in which the packet whose transmission is completed by the packet communication unit 52 is stored, as an interrupt status processing corresponding to the transmission completion status based on the interrupt processing table 160. That is, the CPU 111 deletes the packet which is stored to the packet region 32 and whose transmission is completed.

When it is determined at step S92 that the status is not the transmission completion status or after the processing at step S93 is executed, the process goes to step S94. At step S94, the CPU 111 determines whether or not the status shown by the interrupt status read out at step S91 is the reception completion status, that is, whether or not the low-order first bit of the 32-bit interrupt status is "1" based on the interrupt processing table 160. When the status is the reception completion status, the process goes to step S95.

At step S95, the CPU 111 reads out the packet, which is received by the packet communication unit 52 and stored to the packet region 32 of the RAM 112, based on the interrupt processing table 160 as an interrupt status processing corresponding to the reception completion status and executes a predetermined processing using the packet. The CPU 111 executes, for example, a processing for causing the output unit 17 to display an image corresponding to the packet using the packet.

When if is determine at step S94 that the status is not the reception completion status, or after the processing is executed at step S95, the process goes to step S96. At step S96, the CPU 111 determines whether or not the status shown by the interrupt status read out at step S91 is an error status, that is, whether or not the low-order second bit of the 32-bit interrupt status is "1" based on the interrupt processing table 160.

When it is determined at step S96 that the status is the error status, that is, when the reliability of the packet as the target of transmission read out from the packet region 32 and the reliability of the received packet which is not yet stored to the packet region 32 are not guaranteed, the process goes to step S97.

At step S97, the CPU 111 resets the network card 113 based on the interrupt processing table 160 as an interrupt status processing corresponding to the error status.

Specifically, for example, the CPU 111 initializes a register used to the control of DMA transfer executed by the DMA transfer unit 51 of the network card 113 and revokes a packet which is being transmitted and received by the packet communication unit 52.

When it is determined at step S96 that the status is not the error status or after the processing is executed at step S97, the process goes to step S98 at which the CPU 111 requests the network card 113 to clear the interrupt status, thereby the processing is finished.

Figure 3:
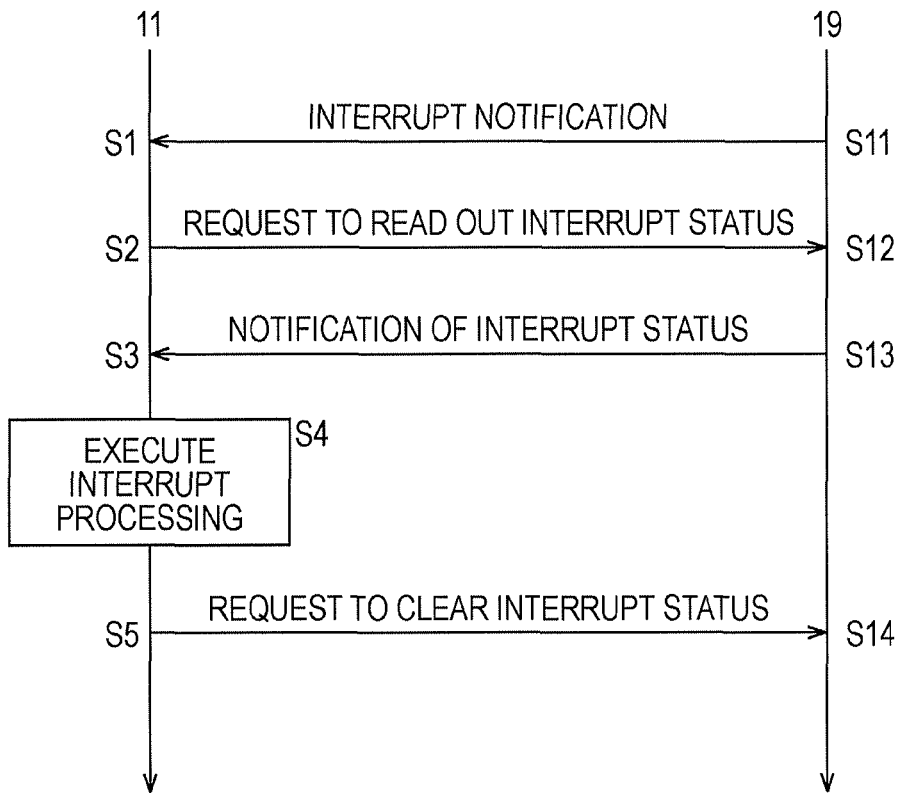
FIG. 3 is an arrow chart explaining an interrupt generation processing executed by the personal computer of FIG. 1.

As described above, in the personal computer 101, since the interrupt status supply unit 141 of the network card 113 stores the interrupt status to the interrupt status region 121 of the RAM 112, the CPU 111 can read out the interrupt status from the RAM 112 in the interrupt processing. That is, the CPU 111 need not to read out the interrupt status from the interrupt status holding unit 142 of the network card 113. As a result, the personal computer 101 can simplify an interrupt processing and reduce a time necessary to the interrupt processing as compared with the case described in FIG. 3.

Next, an interrupt generation processing executed by the personal computer 101 will be explained referring to FIG. 12.

At step S151, the interrupt status supply unit 141 of the network card 113 supplies the interrupt status to the interrupt status region 121 of the RAM 112, and the process goes to step S152.

At step S131, the interrupt status region 121 of the RAM 112 stores the interrupt status from the interrupt status supply unit 141. That is, the interrupt status from the interrupt status supply unit 141 is copied to the interrupt status region 121.

At step S152, the interrupt generation unit 140 of the network card 113 generates an interrupt signal in response to the status information from the DMA transfer unit 51 and notifies the CPU 111 of the interrupt signal, and then the process goes to step S153.

At step S111, the CPU 111 receives the interrupt signal from the interrupt generation unit 140, and the process goes to step S112. At step S112, the CPU 111 requests the RAM 112 to read out the interrupt status, and the process goes to step S113.

After the processing is executed at step S131, the process goes to step S132 at which the interrupt status region 121 of the RAM 112 receives a request for read out the interrupt status from the CPU 111, and the process goes to step S133. At step S133, the interrupt status region 121 notifies the CPU 111 of the interrupt status stored (held) at the time in response to a request for reading out the interrupt status, and the process goes to step S134.

At step S113, the CPU 111 receives the interrupt status from the interrupt status region 121, and the process goes to step S114. At step S114, the CPU 111 executes an interrupt status processing corresponding to the received interrupt status based on the interrupt processing table 160 stored to the interrupt processing table region 122, and the process goes to step S115.

At step S115, the CPU 111 requests the network card 113 to clear the interrupt status held to the interrupt status holding unit 142, thereby the processing is finished. As described above, the CPU 111 executes the processing from steps S112 to S115 as an interrupt processing in response to the interrupt signal supplied from the interrupt generation unit 53 at step S111, thereby the processing is finished.

At step S153, the interrupt status supply unit 141 of the network card 113 receives a request for clearing the interrupt status from the CPU 111 and clears the respective bits of the interrupt status held in the interrupt status holding unit 142, and the process goes to step S154.

At step S154, the interrupt status supply unit 141 reads out the interrupt status held by the interrupt status holding unit 142 and supplies it to the RAM 112, thereby the processing is finished.

At step S134, the interrupt status region 121 of the RAM 112 receives and stores the interrupt status from the interrupt status supply unit 141. That is, the interrupt status held by the interrupt status holding unit 142 is copied to the interrupt status region 121.

Note that a device for generating the interrupt signal is not limited to the network card 113 and may be, for example, a data storage and the like.

As described above, in the personal computer 101, since the interrupt status supply unit 141 supplies the interrupt status stored to the interrupt status holding unit 142 to the interrupt status region 121 of the RAM 112 and the interrupt status region 121 stores the interrupt status, an interrupt processing can be simplified and a time necessary to the interrupt processing can be can be reduced.

Incidentally, in the processing described above, when an interrupt is generated from an interrupt generation unit to a CPU, the contents of an interrupt status holding unit are copied to a memory, and the CPU reads it and finds a cause of the interrupt to thereby reduce the load of the CPU.

Figure 12:
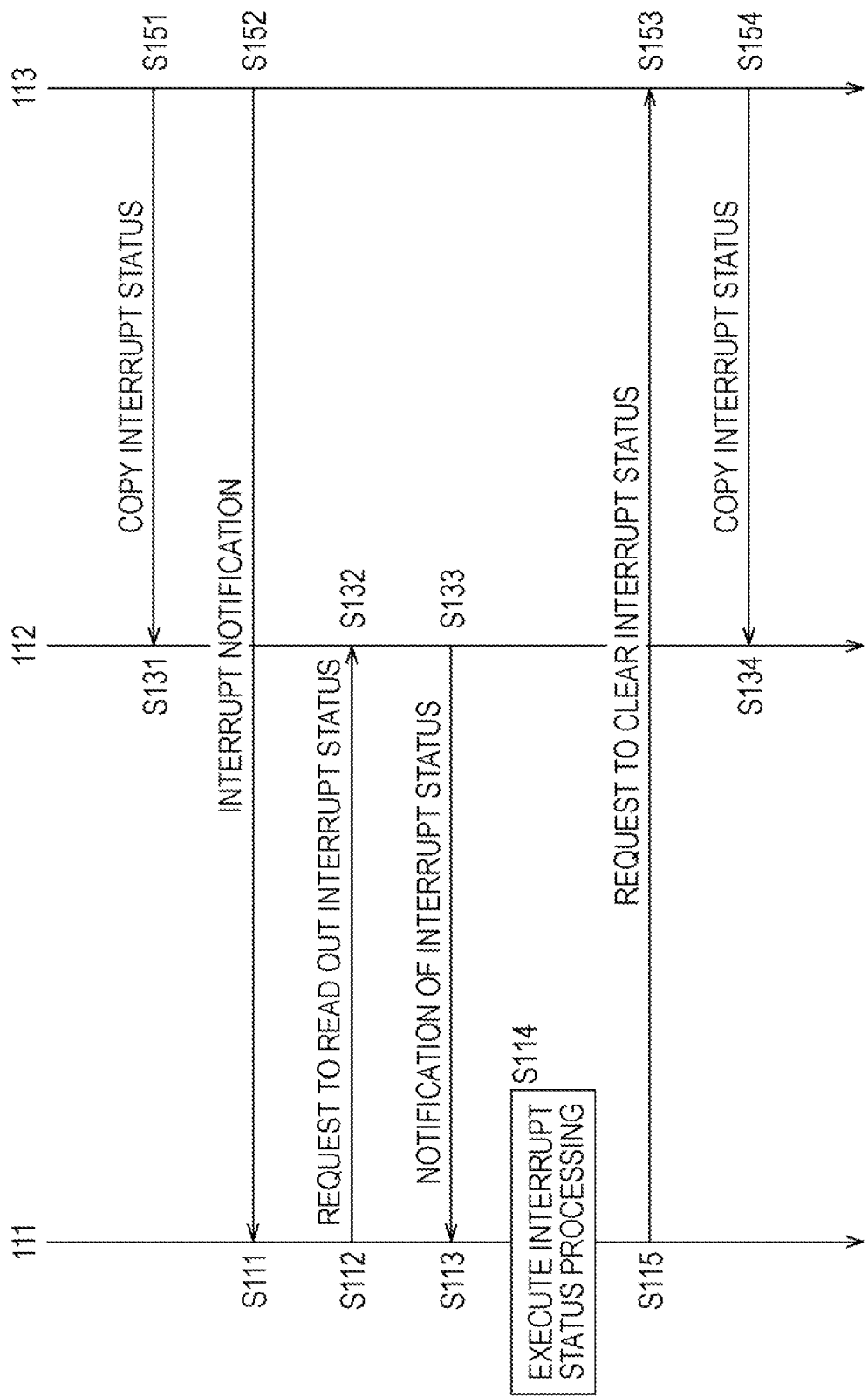
FIG. 12 is an arrow chart explaining an interrupt generation processing executed by the personal computer.

In FIG. 12, in general, although an interrupt notification is executed after the status of the network card 113 is copied to the RAM 112, a mechanism, by which hardware confirms the completion of writing to a memory, cannot be ordinarily guaranteed due to a problem of cost, the specification of a bus, and the like.

As described above, in general, an access to a register such as an interrupt status holding unit and the like of a network card executed by a CPU through a bus and an input/output interface takes a long time as compared with an access to a RAM executed by the CPU through the bus.

Figure 13:
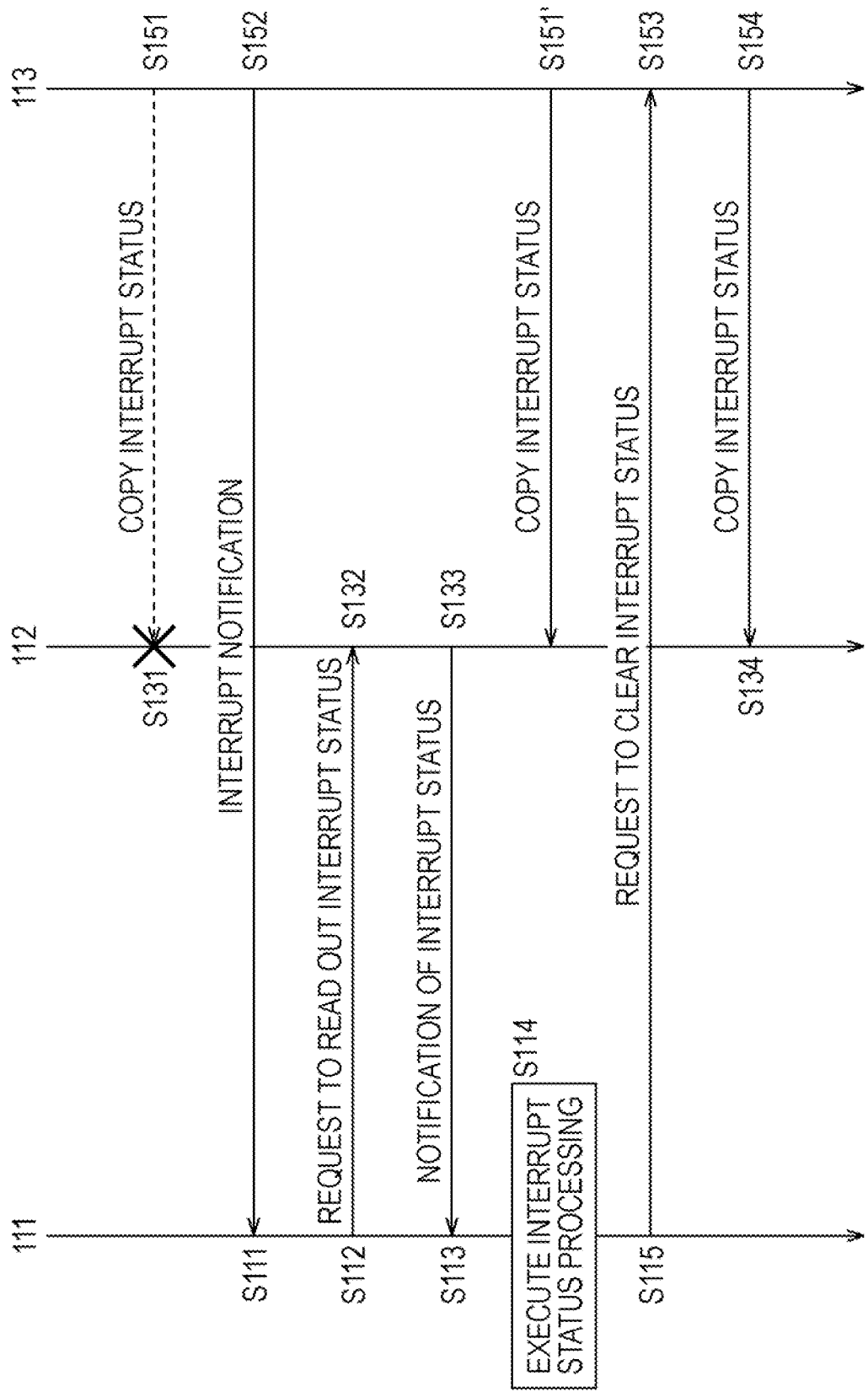
FIG. 13 is an arrow chart explaining a case in which a failure occurs to an operation due to the interrupt generation processing executed by the personal computer.

Accordingly, for example, in a case in which the CPU has a high processing speed, and the like, there is a possibility that the CPU, which receives an interrupt notification before the completion of copy of the interrupt status, executes an interrupt processing based on the interrupt status before it is recorded to a RAM. Further, when, for example, a bus is jammed, and the like, the copy of the interrupt status executed at the same timing as the case of FIG. 12 does not succeed as shown in FIG. 13, and the timing at which the CPU obtains the interrupt status recorded to the RAM is made earlier than the timing at which the copy of the interrupt status succeeds (step S151'). Accordingly, since the interrupt processing is executed based on a previous interrupt status (which corresponds to an old interrupt), there is a possibility that an interrupt cannot be synchronized with an interrupt processing.

Thus, it is further preferable that the CPU can determine whether or not the interrupt status recorded to the RAM is properly updated. Specifically, it is assumed that interrupt version bits, which can be used (updated) by the CPU, are prepared to an interrupt status holding unit of a network card so that data can be written to the region as soon as a status is cleared as well as the backup of an interrupt version bits in a previous processing is stored to a region different from a region (interrupt status region) to which a value held by an interrupt status holding unit of the RAM is copied. Then, it is more preferable that the CPU compares the value of interrupt version bits coped to the RAM with the value of interrupt version bits in a processing before they were backed up each time an interrupt generated so that the CPU can confirm whether or not the status copied to the RAM is synchronized with an actual interrupt status described in the interrupt status holding unit of the network card.

Figure 14:
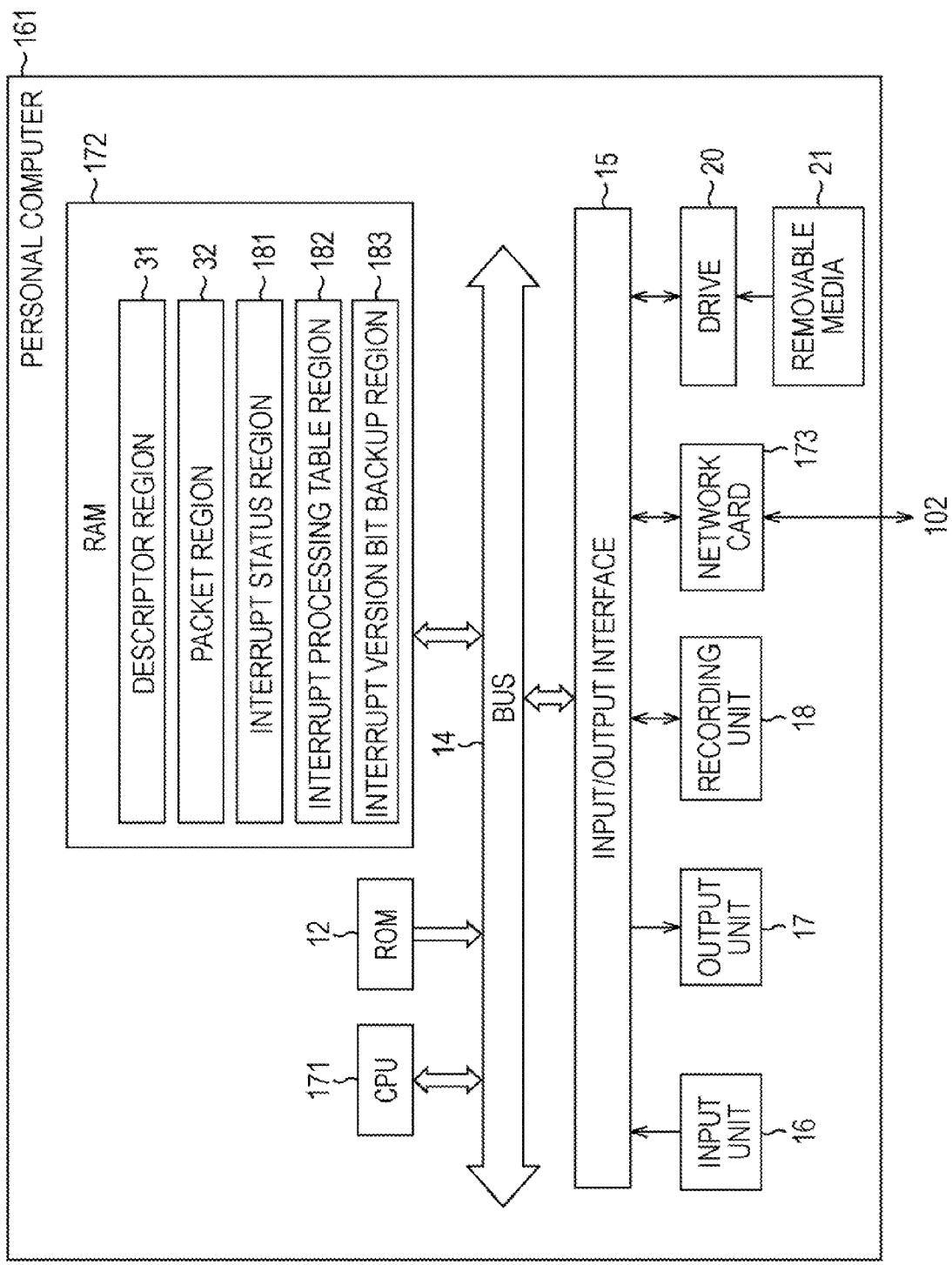
FIG. 14 is a block diagram showing an arrangement of the personal computer.

FIG. 14 is a block diagram showing an arrangement of a personal computer 161 capable of confirming the synchronization of the status copied to the RAM with the actual interrupt status.

Note that the same components as those shown in FIG. 5 are denoted by the same reference numerals and the detailed explanation thereof is appropriately omitted.

That is, the personal computer 161 basically has the same arrangement as the personal computer 101 described using FIG. 5 except that it is provided with a CPU 171 in place of the CPU 111, a RAM 172 in place of the RAM 112, and a network card 173 in place of the network card 113.

Further, the RAM 172 basically has the same arrangement as the RAM 112 described using FIG. 5 except that it is provided with an interrupt status region 181, which can copy interrupt status bits and an interrupt version bits from the network card 173, in place of the interrupt status region 121, a table region 182, which stores an interrupt processing table to be described later using FIG. 16, in place of the interrupt processing table region 122, and an interrupt version bit backup region 183 as an additional region which can hold the backup of interrupt version bits by a processing executed by the CPU 171.

That is, the CPU 171 is connected to a ROM 12 and a RAM 172 through a bus 14 and executes various processings according to a program stored to the ROM 112 or a program recorded to a recording unit 13, For example, the CPU 171 causes a descriptor region 31 of the RAM 172 to store the address, the packet size, and the like of a packet region 32 of the RAM 172, to which a packet as a target of DMA transfer is stored, as a descriptor so that the packet is DMA transferred by the network card 173.

Further, the CPU 171 executes an interrupt processing in response to an interrupt signal supplied from the network card 173. Specifically, the CPU 171 reads out the interrupt version bits stored to an interrupt status region 181 of the RAM 172 together with an interrupt status showing a cause of generation (status) of an interrupt signal. Then, the CPU 171 confirms whether or not a status copied to the RAM 172 is synchronized with an actual interrupt status described in an interrupt status holding unit 191 of the network card 173 (FIG. 15) by referring to the values of the read out interrupt version bit and comparing them with the values backed up to the interrupt version bit backup region 183.

Then, when synchronization is established, the CPU 171 executes an interrupt status processing corresponding to an interrupt status read out from the interrupt status region 181 of the RAM 172 based on an interrupt processing table which is stored to the interrupt processing table region 182 and in which an interrupt status processing is caused to correspond to a status shown by the interrupt status. On the other hand, when synchronization is not established, the CPU 171 reads the actual interrupt status described to the interrupt status holding unit 191 of the network card 173 and executes an interrupt status processing corresponding to the read out interrupt status based on the interrupt processing table which is stored to the interrupt processing table region 182 of the RAM 172 and in which the interrupt status processing is caused to correspond to the status shown by the interrupt status.

Then, after the interrupt status processing is finished, the CPU 171 backs up the value held by the interrupt version bit backup region 183 of the RAM 172 (that is, 1 is incremented to the value before the interrupt status processing). Then, the CPU 171 controls the network card 173 so that the respective bits of the interrupt status (signal) held by the network card 173 are cleared (deleted) as well as the value of the interrupt version bits is incremented by 1.

The RAM 172 is composed of the descriptor region 31, the packet region 32, the interrupt status region 181, the interrupt processing table region 182, and the like.

The interrupt status region 181 stores the interrupt status and the interrupt version bits which are supplied from the network card 173. Further, the interrupt processing table region 182 stores an interrupt processing table previously set by the CPU 171.

The interrupt processing table stored to the interrupt processing table region 182, the arrangement of the interrupt status stored to the interrupt status region 181, and the arrangement of the data described in the interrupt version bits will be explained using FIG. 16.

Figures 16, 17:
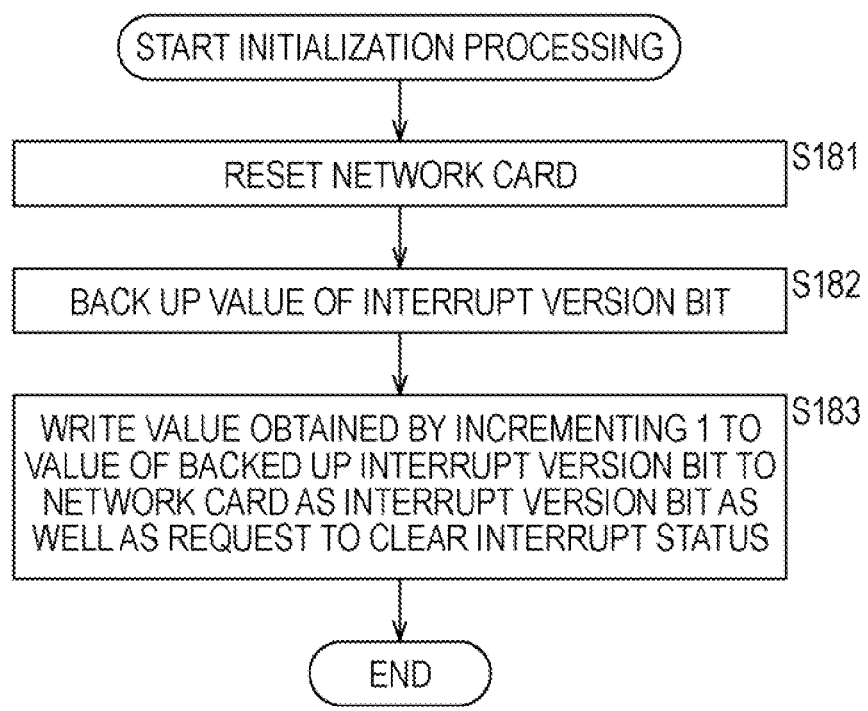
FIG. 16 is a view showing an example of an interrupt processing table.
FIG. 17 is a flowchart explaining an initialization processing.

The interrupt processing table stored to the interrupt processing table region 182 holds the values of the interrupt status and the interrupt version bits having the arrangements shown in FIG. 16. Although the interrupt status is the same as the case explained using FIG. 7, interrupt version bits for high-order 4 bits are further prescribed so that even if "1" is written to the interrupt version bits for the high-order 4 bits, an interrupt processing is not executed. Accordingly, the interrupt status region 181 of the RAM 172 also holds the values of the interrupt status and the interrupt version bits having the data arrangements shown in FIG. 16. It is also assumed here that the values of the interrupt status (signal) and the interrupt version bits are composed of 32 bits similar to the case explained using FIG. 7. However, it is needless to say that the number of the bits may be different from 32 bits.

Since 4 bits are given as the interrupt version bits, the interrupt version bits may be a decimal value from 0 to 15. That is, when the interrupt version bits are to be incremented below, it shows that 1 is incremented to a decimal value of 0 to 14 and further a decimal value of 15 is set to 0.

The network card 173 is composed of, for example, a microcomputer and the like and executes a DMA transfer by executing a predetermined program. Specifically, the network card 173 reads out a packet stored to the packet region 32 of the RAM 172 based on a descriptor stored to the descriptor region 31 of the RAM 172 and transmits the packet to a personal computer 103 through a network 102. Further, the network card 173 receives a packet from the personal computer 103 through the network 102 and causes the packet region 32 of the RAM 172 to store the packet based on the descriptor.

Further, the network card 173 generates an interrupt signal and supplies it to the CPU 171. Further, the network card 173 sets and stores an interrupt status as well as supplies the interrupt status to the interrupt status region 181 of the RAM 172 together with the interrupt version bits and causes the interrupt status region 181 to store them.

Figure 15:
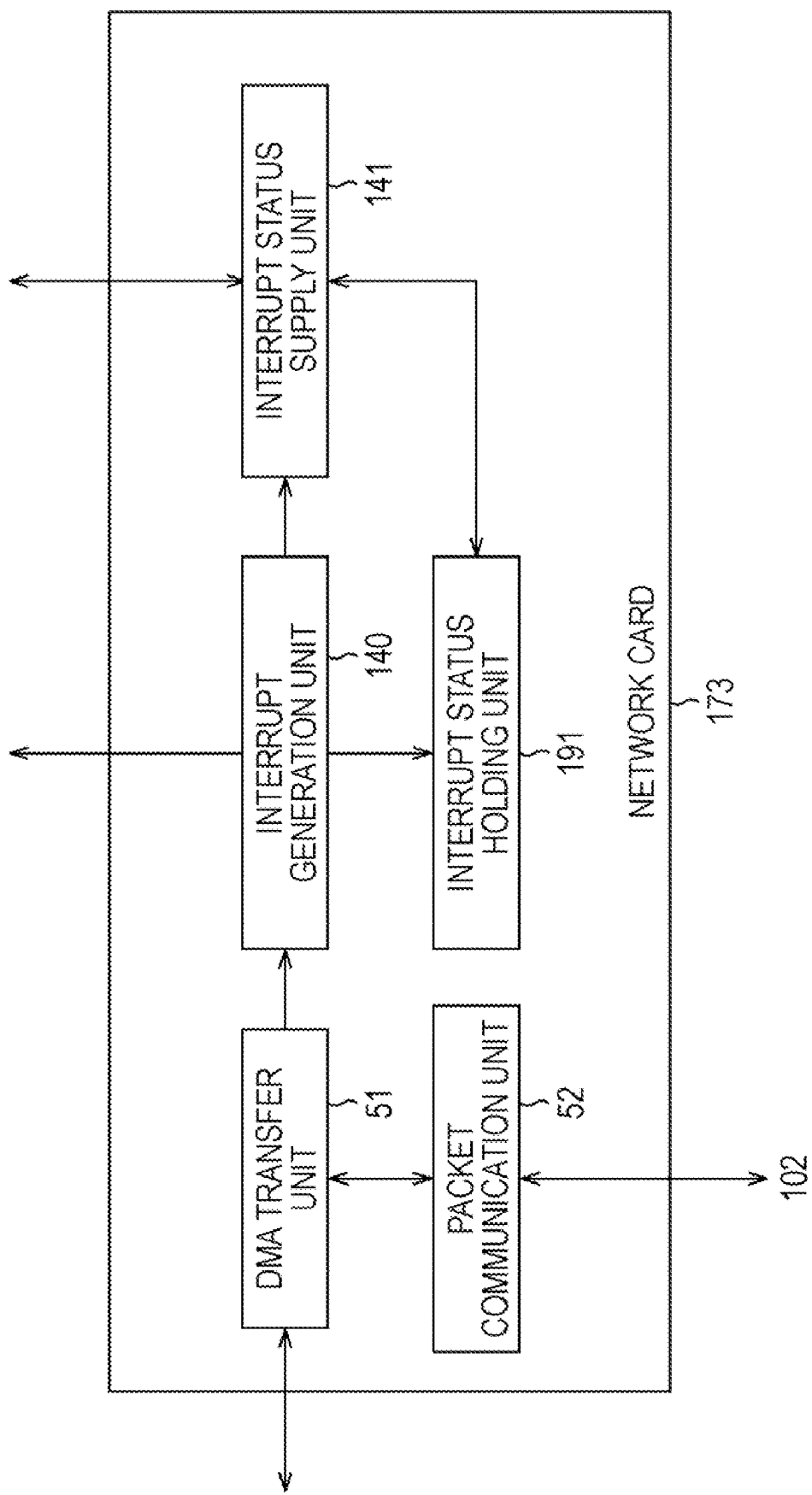
FIG. 15 is a block diagram showing an example of a functional arrangement of the network card of FIG. 14.

FIG. 15 is a block diagram showing an arrangement of the network card 173 of FIG. 14. Note that the same components as those shown in FIG. 6 are denoted by the same reference numerals and the detailed description thereof is appropriately omitted.

That is, the network card 173 of FIG. 15 is basically has the same arrangement as the network card 113 explained using FIG. 6 except that the interrupt status holding unit 191 is provided in place of the interrupt status holding unit 142 a has a similar function.

That is, an interrupt generation unit 140 generates an interrupt signal in response to the status information from a DMA transfer unit 51 and supplies it to the CPU 11. Further, the interrupt generation unit 140 sets an interrupt status in response to the status information and supplies the interrupt status to the interrupt status holding unit 191 and causes the interrupt status holding unit 191 to store (update) it. The interrupt generation unit 140 notifies an interrupt status supply unit 141 of the update of the interrupt status.

The interrupt status supply unit 141 reads out the interrupt status and the interrupt version bits from the interrupt status holding unit 191 in response to the notification from the interrupt generation unit 140, supplies the read out interrupt status and interrupt version bits to the interrupt status region 181 of the RAM 172 and causes the interrupt status region 181 to store them. Further, the interrupt status supply unit 141 clears (deletes) the respective bits of the interrupt status (signal) held by the interrupt status holding unit 191 as well as increments the value of the interrupt version bits by 1 in response to a request from the CPU 171. The interrupt status holding unit 191 holds the values of the interrupt status and the interrupt version bits based on the control of the interrupt generation unit 140 or the CPU 171.

The interrupt status holding unit 191 can hold the values of the bit distribution interrupt status and the interrupt version bits having the same bit distribution as the arrangement shown in FIG. 16. Further, the CPU 171 can optionally use the region of the interrupt status holding unit 191 in which the high-order 4 bits of the 32 bits, that is, the value of the interrupt version bits are held. In other words, the region, in which the value of the interrupt version bits is held, is prepared, as a region whose value can be rewritten under the control of the CPU 171.

The interrupt status and the interrupt version bits, which are held to the interrupt status holding unit 191, are copied to the interrupt status region 181 of the RAM 172 when the CPU 171 instructs to change the values held by the interrupt status holding unit 191 such as when an interrupt occurs and the values of the respective interrupt statuses of completion of transmission, completion of reception, and error are changed in the low-order 0 bit, first bit, and second bit, respectively, and when, for example, the interrupt version bits are incremented, and the like.

Figure 9:
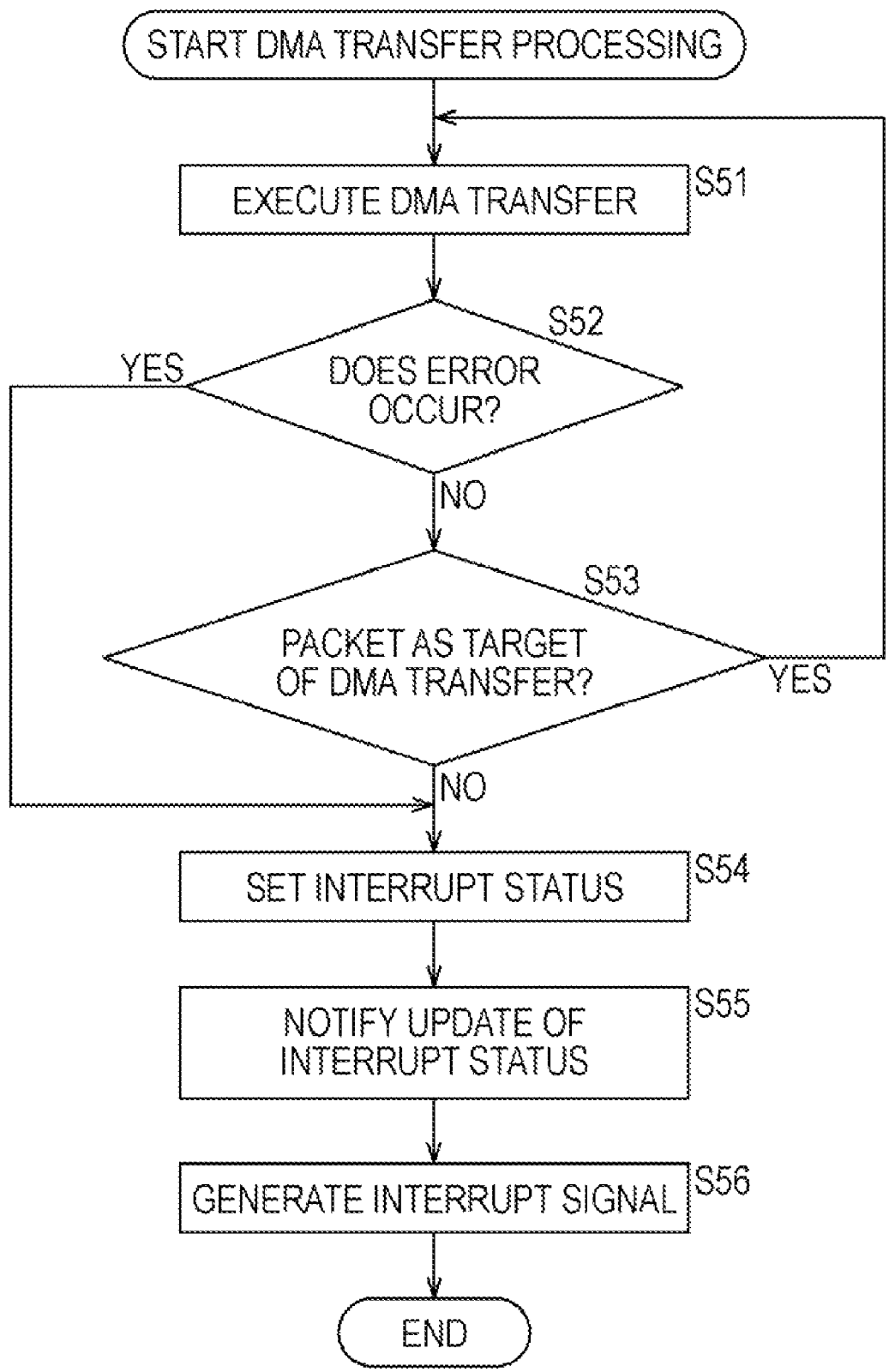
FIG. 9 is a flowchart explaining a DMA transfer processing executed by the network card.
Figure 10:
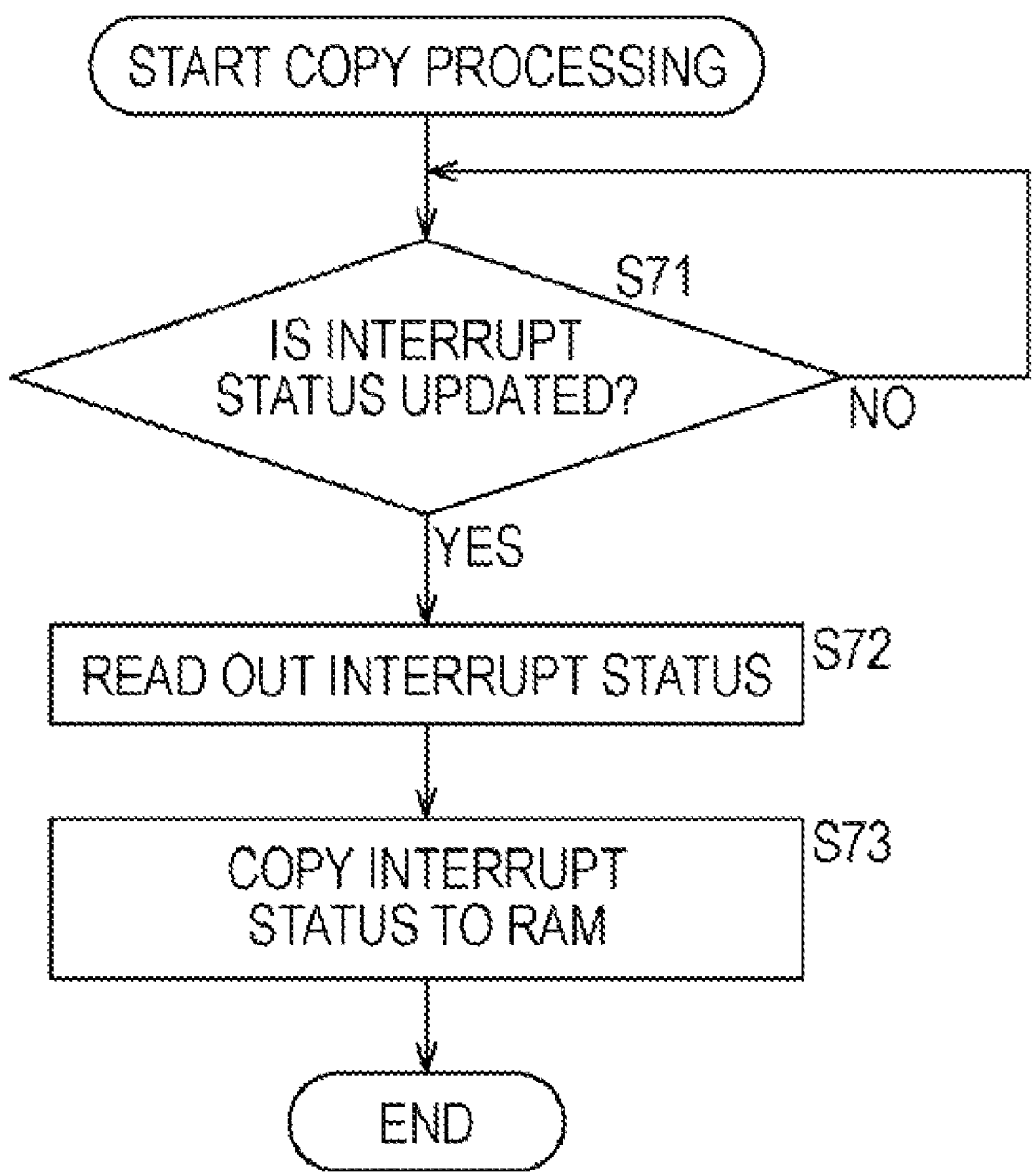
FIG. 10 is a flowchart explaining an interrupt status copy processing executed by the network card.

Note that since a DMA transfer request processing and a DMA transfer processing are basically the same as those explained using FIGS. 8 and 9 also in the personal computer 161 and a copy processing is basically the same as that explained using FIG. 10 except that data to be copied is not only the interrupt status but also the interrupt status and the interrupt version bits, explanation of these processings are omitted.

Next, an initialization processing will be explained referring to a flowchart of FIG. 17. At step S181, the CPU 171 resets the network card 171.

At step S182, the CPU 171 backs up the value of the interrupt version bits of the network card 171 to the interrupt version bit backup region 183 of the RAM 172.

At step S183, the CPU 171 writes a value, which is obtained by incrementing 1 to the value of the interrupt version bits backed up by the interrupt version bit backup region 183 of the RAM 172 at step S182, to a predetermined region (here, the high-order 4 bits) of the interrupt status holding unit 191 of the network card 171 as the interrupt version bits as well as requests to clear the interrupt status of the interrupt status holding unit 191. The value obtained by incrementing 1 to the value of the interrupt version bits backed up by the interrupt version bit backup region 183 is written to the interrupt status holding unit 191 of the network card 171 under the control of the CPU 171 as the interrupt version bits as well as the values of the interrupt statuses such as the completion of transmission, the completion of reception, the error, and the like are cleared, thereby the processing is completed.

Next, an interrupt processing 2 executed by the CPU 171 will be explained referring to a flowchart of FIG. 18. The interrupt processing 1 is started when, for example, an interrupt signal is supplied by the interrupt generation unit 140 at step S56 of FIG. 9.

At step S211, the CPU 171 reads out the interrupt status and the interrupt version bits from the interrupt status region 181 of the RAM 172.

At step S212, the CPU 171 determines whether or not the value of the interrupt version bits read out from the interrupt status region 181 of the RAM 172 is the value obtained by incrementing 1 to the backed up value of the interrupt version bits backed up to the interrupt version bit backup region 183 of the RAM 172.

When it is determined at step S212 that the value of the interrupt version bits read out from the interrupt status region 181 of the RAM 172 is the value obtained by incrementing 1 to the backed up value of the interrupt version bits backed up by the interrupt version bit backup region 183 of the RAM 172, it is assumed that the CPU 171 executes at step 213 the interrupt processing using the interrupt status read out from the RAM 172 at step S211.

When it is determined at step S212 that the value, which is read out from the interrupt status region 181 of the RAM 172, is not the value obtained by incrementing 1 to the backed up value of the interrupt version bits backed up to the interrupt version bit backup region 183 of the RAM 172, it is assumed that the CPU 171 accesses the network card 173 at step S214 without using the interrupt status read out from the RAM 172 at step S211 and executes an interrupt processing by reading out the value of the interrupt status held by the interrupt status holding unit 191 of the network card 173.

Figure 11:
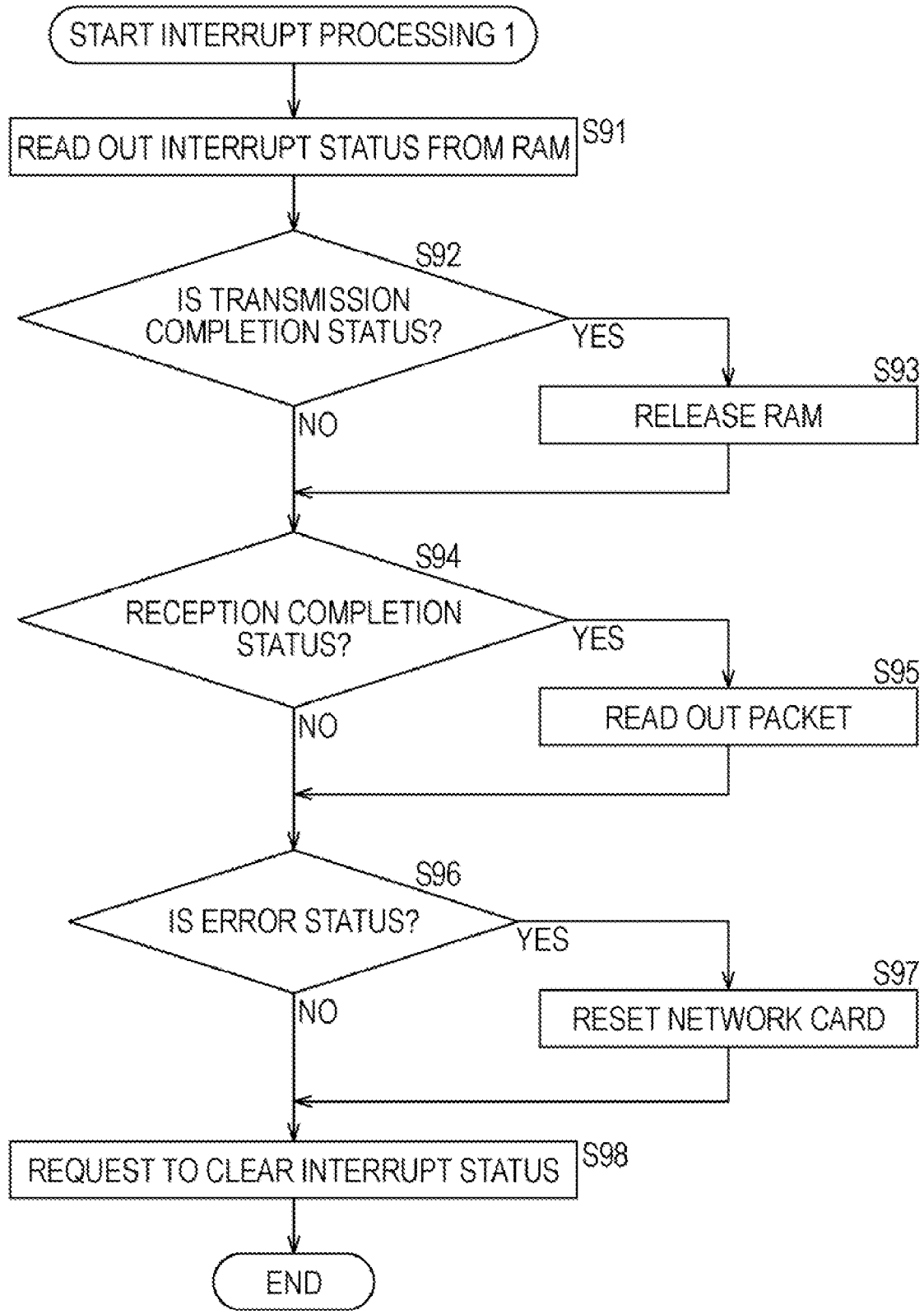
FIG. 11 is a flowchart explaining an interrupt processing 1 executed by the CPU.

After the processing at step S213 or S214 is finished, the CPU 171 executes at steps S215 to S220 basically the same processing as that from steps S92 to S97 of FIG. 11.

That is, the CPU 171 determines whether or not the status shown by the interrupt status read out from the RAM 172 or from the network card 173 is a transmission completion status, that is, whether or not the low-order 0 bit of the 32 bits of the interrupt status is "1" based on the interrupt processing table 160 stored to the interrupt processing table region 121 of the RAM 172. When the CPU 171 determines that the status is the transmission completion status, it releases the packet region 32 of the RAM 172, to which the packet whose transmission is completed by the packet communication unit 52 is stored, as an interrupt status processing corresponding to the transmission completion status based on the interrupt processing table. That is, the CPU 171 deletes the packet which is stored to the packet region 32 and whose transmission is completed.

When the CPU 171 determines that the status is not the transmission completion status or after the RAM 172 is released, it determines whether or not the status shown by the read out interrupt status is a reception completion status, that is, whether or not the low-order first bit of the 32-bit interrupt status is "1". When the CPU 171 determines that the status is the reception completion status, it reads out the packet, which is received by the packet communication unit 52 and stored to the packet region 32 of the RAM 172, and executes a predetermined processing using the packet as an interrupt status processing corresponding to the reception completion status based on the interrupt processing table. For example, the CPU 171 executes a processing for causing the output unit 17 to display an image corresponding to the packet using the packet.

When the CPU 171 determines that the status is not the reception completion status or after the predetermined processing executed using the read out packet is finished, it determines whether or not the status shown by the read out interrupt status is an error status, that is, whether or not the low-order second bit of the 32 bits of the interrupt status is "1". When the CPU 171 determines that the status is the error status, that is, when the reliability of the packet as a transmission target read out from the packet region 32 and the reliability of a received packet which is not yet stored to the packet region 32 are not guaranteed, the CPU 171 resets the network card 113 as an interrupt status processing corresponding to the error status based on the interrupt processing table 160. Specifically, the CPU 171, for example, initializes a register used to control a DMA transfer executed by the DMA transfer unit 51 of the network card 173 or abandons the packet which is being transmitted or received by the packet communication unit 52.

When it is determined that the status is not the error status at step S219 or after the processing at step S220 is finished, 1 is incremented by the CPU 171 to the value of the interrupt version bits backed up to the interrupt version bit backup region 183 of the RAM 172 at step S221.

At step S222, the CPU 171 writes the value obtained by incrementing 1 to the value of the backed up interrupt version bits at step S221 to the interrupt status holding unit 191 of the network card 173 as the interrupt version bits as well as requests the network card 173 to clear the interrupt status, thereby the processing is finished.

As described above, it can be determined whether or not the interrupt status copied to the RAM 173 is synchronized with the interrupt status of the network card 173. When they are synchronized with each other, the CPU 171 executes an interrupt processing based on the interrupt status copied to the RAM 173, whereas when they are not synchronized with each other, the CPU 171 accesses the network card 173 and executes the interrupt processing by reading out the interrupt status of the network card 173. Accordingly, the interrupt processing can be simplified and a time necessary to the interrupt processing can reduced as well as the CPU 171, which received a notification of interrupt before the copy of the interrupt status is completed, can be prevented from executing an interrupt processing based on the interrupt status before it is recorded to the RAM 172.

Specifically, as shown in FIGS. 19 and 20, the processing is different depending on a timing at which the interrupt status from the interrupt status supply unit 141 is stored to the interrupt status region 181 of the RAM 172.

A processing will be explained using FIG. 19 which is executed when the CPU 171 accesses the interrupt status region 181 of the RAM 172, the processing being executed when the interrupt status copied to the RAM 173 is synchronized with the interrupt status of the network card 173.

At step S291, the interrupt status supply unit 141 of the network card 173 supplies an interrupt status to the interrupt status region 121 of the RAM 172.

At step S271, the interrupt status region 181 of the RAM 172 stores the interrupt status from the interrupt status supply unit 141. That is, the interrupt status from the interrupt status supply unit 141 is copied to the interrupt status region 181.

At step S292, the interrupt generation unit 140 of the network card 173 generates an interrupt signal in response to the status information from the DMA transfer unit 51 and notifies the CPU 171 the interrupt signal.

The CPU 171 receives the interrupt signal from the interrupt generation unit 140 at step S251 and requests the RAM 172 to read out the interrupt status at step S252.

The interrupt status region 181 of the RAM 172 receives the request for reading out the interrupt status from the CPU 171 at step S272 and notifies the CPU 171 of the interrupt status stored (held) at the time at step S27 in response to a request for reading out the interrupt status. Here, since interrupt status is copied at step S271, the interrupt status recorded to the interrupt status region 181 of the RAM 172 is synchronized with the interrupt status recorded to the interrupt status holding unit 191 of the network card 173.

The CPU 171 receives the interrupt status from the interrupt status region 121 at step S253 and compares the backed up interrupt version bits with the interrupt version bits read out from the RAM 172 (processing at step S212 of FIG. 18) at step S254. Here, since interrupt status recorded to the interrupt status region 181 of the RAM 172 is synchronized with that recorded to the interrupt status holding unit 191 of the network card 173, the CPU 171 executes an interrupt status processing (processings at step S213 and steps S215 to S220 of FIG. 18) at step S255 using the interrupt status of the RAM 172 based on the interrupt processing table 160 stored to the interrupt processing table region 122.

Then, at step S256, the CPU 171 increments the value of the interrupt version bits backed up to the interrupt version bit backup region 183 of the RAM 173 by 1 (processing at step S221 of FIG. 18).

At step S257, the CPU 171 increments the interrupt version bits held to the interrupt status holding unit 142 by 1 and requests the network card 173 to clear the interrupt status (processing at step S222 of FIG. 18).

Then, at step S293, the interrupt status supply unit 141 of the network card 173 receives a request for incrementing the interrupt version bits supplied from the CPU 171 and clearing the interrupt status and increments the interrupt version bits held by the interrupt status holding unit 142 as well as clears the respective bits of the interrupt status held by the interrupt status holding unit 142. Then, the interrupt status supply unit 141 reads out the interrupt status held by the interrupt status holding unit 142 and supplies it to the RAM 172 at step S294.

At step S274, the interrupt status region 181 of the RAM 172 receives the interrupt status and the interrupt version bit supplied thereto and stores them. That is, the interrupt status and the interrupt version bits held by the interrupt status holding unit 191 are copied to the interrupt status region 181, thereby the processing is finished.

As described above, when it is determined that the interrupt status is copied to the RAM 172 in synchronism, the CPU 171 can execute the interrupt processing at a high speed as compared with a case in which the interrupt status is obtained by transmitting and receiving information to and from the network card 173 each time.

Next, a processing will be explained using FIG. 20 which is executed when the interrupt status copied to the RAM 173 is not synchronized with the interrupt status of the network card 173 at the time the CPU 171 accesses the interrupt status region 181 of the RAM 172.

At step S351, the interrupt status supply unit 141 of the network card 173 supplies the interrupt status to the interrupt status region 181 of the RAM 172.

However, the interrupt status region 181 of the RAM 172 fails to store the interrupt status from the interrupt status supply unit 141. That is, the interrupt status from the interrupt status supply unit 141 is not copied to the interrupt status region 181. The interrupt status supply unit 141 of the network card 173 executes again a processing for supplying the interrupt status to the interrupt status region 181 of the RAM 172 (processing at step S355 to be described later).

At step S352, the interrupt generation unit 140 of the network card 173 generates an interrupt signal in response to the status information from the DMA transfer unit 51 and notifies the CPU 171 of the interrupt signal.

The CPU 171 receives the interrupt signal from the interrupt generation unit 140 at step S311 and requests the RAM 172 to read out the interrupt status at step S312.

The interrupt status region 181 of the RAM 172 receives the request for reading out the interrupt status from the CPU 171 at step S331 and notifies the CPU 171 of the interrupt status stored (held) at the time at step S332 in response to the request for reading out the interrupt status. Here, since the copy of interrupt status fails, the interrupt status recorded to the interrupt status region 181 of the RAM 172 is not synchronized with that recorded to the interrupt status holding unit 191 of the network card 173.

The CPU 171 receives the interrupt status from the interrupt status region 121 at step S313 and compares the backed up interrupt version bits with the interrupt version bits read out from the RAM 172 at step S314 (processing at step S212 of FIG. 18). Here, since the value of the backed up interrupt version bits is equal to the value of the interrupt version bits red out from the RAM 172, it is determined that the interrupt status recorded to the interrupt status region 181 of the RAM 172 is not synchronized with the interrupt status recorded to the interrupt status holding unit 191 of the network card 173.

Then, at step S315, the CPU 171 requests the interrupt status holding unit 191 of the network card 173 to read out the interrupt status.

The interrupt status supply unit 141 of the network card 173 receives the request for reading out the interrupt status at step S353, reads out the interrupt status stored to the interrupt status holding unit 191, and supplies it to the CPU 171 at step S354.

The CPU 171 receives the notification of the interrupt status from the interrupt status supply unit 141 of the network card 173 at step S316 and executes an interrupt status processing corresponding to the received interrupt status (processings at step S214 and steps S215 to S220 of FIG. 18) at step S317 using the supplied interrupt status based on the interrupt processing table 160 stored to the interrupt processing table region 122.

Then, at step S318, the CPU 171 increments the value of the interrupt version bits backed up to the interrupt version bit backup region 183 of the RAM 173 by 1 (processing at step S221 of FIG. 18).

At step S355, the interrupt status supply unit 141 of the network card 173 supplies the interrupt status to the interrupt status region 121 of the RAM 172.

Then, at step S333, the interrupt status region 181 of the RAM 172 stores the interrupt status from the interrupt status supply unit 141. That is, the interrupt status from the interrupt status supply unit 141 is copied to the interrupt status region 181.

At step S319, the CPU 171 increments the interrupt version bits held to the interrupt status holding unit 142 by 1 and requests the network card 173 to clear the interrupt status (processing at step S222 of FIG. 18).

Then, at step S356, the interrupt status supply unit 141 of the network card 173 receives the increment of the interrupt version bits supplied from the CPU 171 and the request for clearing the interrupt status and increments the interrupt version bits as well as clears the respective bits of the interrupt status held to the interrupt status holding unit 142. Then, the interrupt status supply unit 141 reads out the interrupt status held to the interrupt status holding unit 142 and supplies it to the RAM 172 at step S357.

At step S334, the interrupt status region 181 of the RAM 172 receives and stores the interrupt status and the interrupt version bits supplied thereto. That is, the interrupt status and the interrupt version bits held to the interrupt status holding unit 191 are copied to the interrupt status region 181, thereby the processing is finished.

As described above, when it is determined that the copy of the interrupt status to the RAM 172 is not synchronized, since the CPU 171 obtains the interrupt status by transmitting and receiving information to and from the network card 173, it does not execute an erroneous interrupt processing by a past interrupt status.

As described above, the CPU can reduce the load of a read processing of an interrupt factor using the status copied to the RAM by applying the present invention. Further, when the statuses copied to the RAM are synchronized, the CPU executes the interrupt processing using the statuses read out from the RAM and when the statuses copied to the RAM are not synchronized, the CPU does not use the statuses copied to the RAM in consideration of a case that a timing of a status copy does not agree with a timing of an interrupt, thereby it can be prevented to execute an erroneous interrupt.

Note the device for generating the interrupt signal is not limited to the network card 173, i may be for example, a data storage and the like.

Note that it is described here that when the value of the interrupt version bits backed up by the CPU 171 is compared with the value of the interrupt version bits copied by the RAM 172 (when the value is correctly copied, the value is obtained by incrementing 1 to the backed up value of the interrupt version bits written to the interrupt status holding unit 191 of the network card 173 as the interrupt version bits) and the value of the interrupt version bits copied to the RAM 172 is larger than the backed up value of the interrupt version bits by 1, the interrupt statuses copied to the RAM 172 are synchronized. However, it is needless to say that the number of bits allocated to the interrupt version bits and the value incremented at a time may be different as long as it can be determined whether or not the interrupt statuses copied to the RAM 172 are synchronized.

Further, although the interrupt processing is described here, the present invention can be also applied when polling is executed at a predetermined interval to reduce the number of times of interrupt. In this case, a similar processing can be executed by replacing the portion of the interrupt processing executed by hardware (the interrupt processing executed by the interrupt from the network card) with an interrupt processing executed by an interrupt generated by a timer.

Here, the processing steps for describing the program to cause the computer to execute various processings need not always be executed time sequentially according to the sequence described as the flowcharts and include processings executed in parallel or individually (for example, parallel processings or processings executed according to an object.

Further, the program may be executed by one computer or by a plurality of computers. Further, the program may be executed after it is transferred to a remote computer.

Note that, in the description, the system shows an overall apparatus composed of a plurality of devices.

Note that embodiment of the present invention is by no means limited to the embodiment described above and may be variously modified within the scope which does not depart from the gist of the present invention.

The invention claimed is:

1. An information processing apparatus comprising:
generation means for generating an interrupt signal;
first memory means for storing a status indicating a cause for generating the interrupt signal;
execution means for executing predetermined processing in response to the status stored at the first memory means, wherein the generation means comprises second memory means for storing the status of the interrupt signal; and
memory control means for causing the first memory means to store the status stored by the second memory means,
wherein the second memory means includes a first memory region of determination information for determining whether or not a first status stored at the first memory means is synchronized with a second status stored at the second memory means.

2. An information processing apparatus according to claim 1, wherein a first time necessary for the execution means to read out the status stored by the first memory means is shorter than a second time necessary for the execution means to read out the status stored by the second memory means.

3. An information processing apparatus according to claim 1, wherein:
wherein the first memory means includes a second memory region for storing the determination information, and a third memory region, different from the second memory region, for temporarily storing the determination information;
the memory control means stores the status stored by the second memory means at the first memory means, and stores the determination information recorded to the first memory region of the second memory means at the second memory region of the first memory means;
the execution means executes the predetermined processing in response to the first status stored by the first memory means, when it is determined that the first status stored by the first memory means is synchronized with the second status stored by the second memory means based on the determination information stored at the third memory region; and
the execution means executes the predetermined processing in response to the second status stored by the second memory means, when it is determined that the first status stored by the first memory means is not synchronized with the second status stored by the second memory means based on the determination information stored at the third memory region.

4. An information processing apparatus according to claim 3, wherein:
the determination information comprises a numerical value;
after a predetermined processing is executed in response to the first status or the second status, the execution means causes the third memory region to store the same value as the determination information stored at the first memory region, and increments by 1, the value of the determination information stored at the first memory region; and
during execution of the predetermined processing, the execution means compares the determination information stored at the second memory region with the determination information stored at the third memory region, and when the value of the determination information stored to the second memory region is larger than the determination information stored to the third memory region by 1, the execution means determines that the first status stored by the first memory means is synchronized with the second status stored by the second memory means, and executes the predetermined processing in response to the first status stored by the first memory means, and otherwise determines that the first status stored by the first memory means is not synchronized with the second status stored by the second memory means, and executes the predetermined processing in response to the second status stored by the second memory means.

5. An information processing apparatus for generating an interrupt signal comprising:

generation means for generating the interrupt signal;

memory means for storing a status indicating a cause for generating the interrupt signal; and memory control means for causing another information processing apparatus to store the status stored by the memory means, so that the other information processing apparatus executes predetermined processing in response to the status, wherein the memory means further stores determination information for determining whether or not the status stored at the other information processing apparatus is synchronized with the status stored at the memory means.

6. An information processing apparatus according to claim 5, wherein:

wherein the memory control means causes the other information processing apparatus to record the determination information together with the status.

7. An information processing method performed by an information processing apparatus for generating an interrupt signal, the apparatus comprising a memory means for storing a status indicating a cause for generating the interrupt signal, the method comprising:

a generation step of generating the interrupt signal;

a first memory control step for causing the memory means to store the status of the interrupt signal generated by the generation step; and a second memory control step for causing another information processing apparatus to store the status stored by the memory means, so that the other information processing apparatus executes predetermined processing in response to the status, wherein the memory means includes a first memory region of determination information for determining whether or not a first status stored at the other information processing apparatus is synchronized with a second status stored by the memory means.

8. A computer readable non-transitory recording medium having executable instructions stored thereon, the executable instructions causing a computer to perform a plurality of steps, the computer being configured for controlling an information processing apparatus comprising a memory means for storing a status indicating a cause for generating an interrupt signal, the plurality of steps comprising:

a generation step of generating the interrupt signal;

a first memory control step for causing the memory means to store the status of the interrupt signal generated by the generation step; and a second memory control step for causing another information processing apparatus to store the status stored by the memory means, so that the other information processing apparatus executes predetermined processing in response to the status, wherein the memory means includes a first memory region of determination information for determining whether or not a first status stored at the other information processing apparatus is synchronized with a second status stored at the memory means.

9. An information processing apparatus for executing predetermined processing in response to a status indicating a cause for generating an interrupt signal generated by another information processing apparatus, the apparatus for executing the predetermined processing comprising:

memory means for storing the status of the interrupt signal supplied from the other information processing apparatus; and execution means for executing the predetermined processing in response to the status stored by the memory means, wherein the memory means obtains, from the other information processing apparatus, information for determining whether or not the status stored at the memory means is synchronized with the status stored at the other information processing apparatus.

10. An information processing apparatus according to claim 9, wherein:

the memory means further stores the status stored at the other information processing apparatus and the determination information; and the execution means determines whether or not the status stored by the memory means is synchronized with the status stored at the other information processing apparatus based on the determination information, and when it is determined that they are synchronized with each other, the execution means executes the predetermined processing in response to the status stored by the memory means, whereas when it is determined that they are not synchronized with each other, the execution means obtains the status from the other information processing apparatus and executes the predetermined processing in response to the status obtained from the other information processing apparatus.

11. An information processing apparatus according to claim 9 further comprising:

interrupt processing memory means for storing a table wherein the status of the interrupt signal corresponds to particular processing, wherein the execution means executes the predetermined processing based on the table stored at the interrupt processing memory means.

12. An information processing method performed by an information processing apparatus for executing predetermined processing in response to a status indicating a cause for generating an interrupt signal generated by another information processing apparatus, the method comprising:

a memory control step of causing the status of the interrupt signal supplied from the other information processing apparatus to be stored in a memory means; and an execution step of executing the predetermined processing in response to the status stored in the memory control step, wherein the other information processing apparatus includes a first memory region of determination information for determining whether or not a first status stored at the memory means is synchronized with a second status stored at the other information processing apparatus.

13. A computer readable non-transitory recording medium having executable instructions stored thereon, the executable instructions causing a computer to execute predetermined processing in response to a status showing a cause for generating an interrupt signal generated by another information processing apparatus, and causing the computer to perform a plurality of steps comprising:

a memory control step of causing the status of the interrupt signal supplied from the other information processing apparatus to be stored in a memory means; and an execution step of executing the predetermined processing in response to the status stored by the processing at the memory control step;

wherein the other information processing apparatus comprises determination information for determining whether or not a first status stored at the memory means is synchronized with a second status stored at the other information processing apparatus.

* * * * *